(12) United States Patent
Thomson et al.

(10) Patent No.: US 11,294,368 B2
(45) Date of Patent: Apr. 5, 2022

(54) ADJUSTING INDUSTRIAL VEHICLE PERFORMANCE

(71) Applicant: Crown Equipment Corporation, New Bremen, OH (US)

(72) Inventors: Jacob J. Thomson, Auckland (NZ); Lisa Wong, Auckland (NZ); Lucas B. Waltz, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 394 days.

(21) Appl. No.: 16/587,734

(22) Filed: Sep. 30, 2019

(65) Prior Publication Data

US 2020/0026271 A1 Jan. 23, 2020

Related U.S. Application Data

(62) Division of application No. 15/298,460, filed on Oct. 20, 2016, now Pat. No. 10,429,831.

(Continued)

(51) Int. Cl.
*G05D 1/00* (2006.01)
*G06Q 50/28* (2012.01)
(Continued)

(52) U.S. Cl.
CPC ............ *G05D 1/0005* (2013.01); *B60L 58/10* (2019.02); *G05D 1/0217* (2013.01);
(Continued)

(58) Field of Classification Search
None
See application file for complete search history.

(56) References Cited

U.S. PATENT DOCUMENTS 10,429,831 B2 10/2019 Thomson et al.
2006/0074707 A1* 4/2006 Schuette .............. G06Q 10/087
705/28

(Continued)

FOREIGN PATENT DOCUMENTS

CN 102030263 A 4/2011
EP 0523142 A1 1/1993
(Continued)

OTHER PUBLICATIONS

Examination Report No. 1 dated Jun. 29, 2021; Australian Application No. 2016342176; IP Australia.

(Continued)

*Primary Examiner* — Todd Melton
*Assistant Examiner* — Jason R Roberson
(74) *Attorney, Agent, or Firm* — Stevens & Showalter LLP

(57) ABSTRACT

A process for modifying vehicle performance parameters for one or more kinematic functions while executing an assigned task is disclosed. The process comprises receiving, for an industrial vehicle, a job specification and decomposing the job specification into a workflow model, with the workflow model defining the tasks of the industrial vehicle. The process further comprises associating the tasks with a kinematic model. The kinematic model is generated by identifying the kinematic function of the industrial vehicle, receiving constraints associated with an operation of the industrial vehicle, and computing a cutback curve for a parameter of the kinematic function. The kinematic model is applied to the workflow model. The performance parameter of the industrial vehicle is modified based on the applied kinematic model to the workflow model.

20 Claims, 19 Drawing Sheets

Related U.S. Application Data

(60) Provisional application No. 62/304,122, filed on Mar. 4, 2016, provisional application No. 62/303,780, filed on Mar. 4, 2016, provisional application No. 62/243,953, filed on Oct. 20, 2015.

(51) Int. Cl.

| | |
|---|---|
| *G05D 1/02* | (2020.01) |
| *G06Q 10/06* | (2012.01) |
| *B60L 58/10* | (2019.01) |
| *G07C 5/08* | (2006.01) |
| *G07C 5/00* | (2006.01) |
| *G01C 21/20* | (2006.01) |

(52) U.S. Cl.
CPC ......... *G05D 1/0291* (2013.01); *G06Q 10/067* (2013.01); *G06Q 10/06312* (2013.01); *G06Q 10/06395* (2013.01); *G06Q 50/28* (2013.01); *G07C 5/0808* (2013.01); *G01C 21/206* (2013.01); *G05D 2201/0216* (2013.01); *G07C 5/008* (2013.01)

(56) References Cited

U.S. PATENT DOCUMENTS

| | | | |
|---|---|---|---|
| 2008/0154691 A1* | 6/2008 | Wellman | G06Q 10/06316 705/7.26 |
| 2008/0154712 A1 | 6/2008 | Wellman | |
| 2010/0039247 A1 | 2/2010 | Ziegler et al. | |
| 2011/0270486 A1* | 11/2011 | Stevens | G07C 5/0816 701/31.4 |
| 2012/0046809 A1* | 2/2012 | Wellman | G06Q 10/06398 701/2 |
| 2014/0046634 A1* | 2/2014 | Kersh | G06F 30/20 703/1 |
| 2014/0278823 A1 | 9/2014 | de Oliveira et al. | |

FOREIGN PATENT DOCUMENTS

| | | |
|---|---|---|
| EP | 1646005 A2 | 4/2006 |
| WO | 2008074008 A2 | 6/2008 |

OTHER PUBLICATIONS

International Preliminary Report on Patentability dated Apr. 24, 2018; International Application No. PCT/US2016/057888; The International Bureau of WIPO; Geneva, Switzerland.
Van Der Weiden, AD; International Search Report and Written Opinion; International Patent Application No. PCT/US2016/057888; dated Dec. 8, 2016; European Patent Office; Rijswijk, Netherlands.
Roberson, Jason R.; Notice of Allowance; U.S. Appl. No. 15/298,460; dated Jul. 31, 2019; United States Patent and Trademark Office; Alexandria, VA.
Roberson, Jason R.; Notice of Allowance; U.S. Appl. No. 15/298,460; dated May 22, 2019; United States Patent and Trademark Office; Alexandria, VA.
Roberson, Jason R.; Office Action; U.S. Appl. No. 15/298,460; dated Nov. 7, 2018; United States Patent and Trademark Office; Alexandria, VA.
Communication Pursuant to Article 94(3) EPC dated Oct. 14, 2020; European Patent Application No. 16788381; European Patent Office; Rijswijk, Netherlands.
Tan, Yujing; Notification of the First Office Action dated May 11, 2021; Chinese Application No. 201680059631.8; China National Intellectual Property Administration; Beijing, China.
First Search dated Apr. 28, 2021; Chinese Application No. 201680059631.8; China National Intellectual Property Administration; Beijing, China.
Marina Olimpia Castro Alvear; Office Action dated May 14, 2021; Mexican Application No. MX/a/2018/004593; Mexican Institute of Industrial Property.
Office Action dated Nov. 3, 2021; Mexican Application No. MX/a/2018/004593; Mexican Institute of Industrial Property; Mexico City, Mexico.

* cited by examiner

ADJUSTING INDUSTRIAL VEHICLE PERFORMANCE

CROSS REFERENCE TO RELATED APPLICATIONS

This application is a divisional application of U.S. patent application Ser. No. 15/298,460, filed Oct. 20, 2016, entitled ADJUSTING INDUSTRIAL VEHICLE PERFORMANCE, now allowed, which claims the benefit of U.S. Provisional Patent Application Ser. No. 62/243,953, filed Oct. 20, 2015, entitled FLEET ESTIMATOR TOOL & METHOD OF CONFIGURING FLEET OF MATERIALS HANDLING VEHICLES, U.S. Provisional Patent Application Ser. No. 62/303,780, filed Mar. 4, 2016, entitled FLEET ESTIMATOR & STIMULATOR TOOLS AND METHODS OF CONFIGURING FLEET OF MATERIALS HANDLING VEHICLES, and U.S. Provisional Patent Application Ser. No. 62/304,122, filed Mar. 4, 2016, entitled EVALUATING INDUSTRIAL VEHICLE PERFORMANCE, the disclosures of which are hereby incorporated herein by reference.

BACKGROUND

The present disclosure relates to electronic systems for evaluating industrial vehicle performance, and in particular to the evaluation of industrial vehicles based on simulations, empirical data, or a combination thereof.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, forklift trucks are linked to a management system executing on a corresponding computer enterprise via wireless transceivers. The wireless transceivers are used as interfaces to the management system to direct workers in their tasks, e.g., by instructing workers where and/or how to pick, pack, put away, move, stage, process or otherwise manipulate items within a facility.

BRIEF SUMMARY

According to aspects of the present disclosure, a process to modify vehicle performance parameters for industrial vehicles is provided. In some embodiments, the process modifies vehicle performance parameters for one or more kinematic functions while executing an assigned task. In one example embodiment, the process receives, for the industrial vehicle, a job specification and simulates the job specification. The simulation is done by decomposing the job specification into a workflow model, with the workflow model defining tasks of the industrial vehicle within an environment associated with performance of an operation. The simulation further associates the tasks with a kinematic model. The kinematic model is generated by identifying kinematic functions of the industrial vehicle, receiving constraints of an environment in which the industrial vehicle operates, computing a cutback curve for a parameter of a select kinematic function of the industrial vehicle, and applying the kinematic model to the workflow model based upon a travel path of the job specification to determine results. The vehicle performance parameters are modified in response to simulating the job specification.

Another aspect of the disclosed embodiments comprises receiving, for the industrial vehicle, a job specification and decomposing the job specification into a workflow model, with the workflow model defining the tasks of the industrial vehicle. For some embodiments, the process further comprises associating the tasks with a kinematic model. The kinematic model is generated by identifying the kinematic function of the industrial vehicle, receiving constraints associated with an operation of the industrial vehicle, and computing a cutback curve for a parameter of the kinematic function. The kinematic model is applied to the workflow model. The performance parameter of the industrial vehicle is modified based on the applied kinematic model to the workflow model.

DETAILED DESCRIPTION

Figure 1:
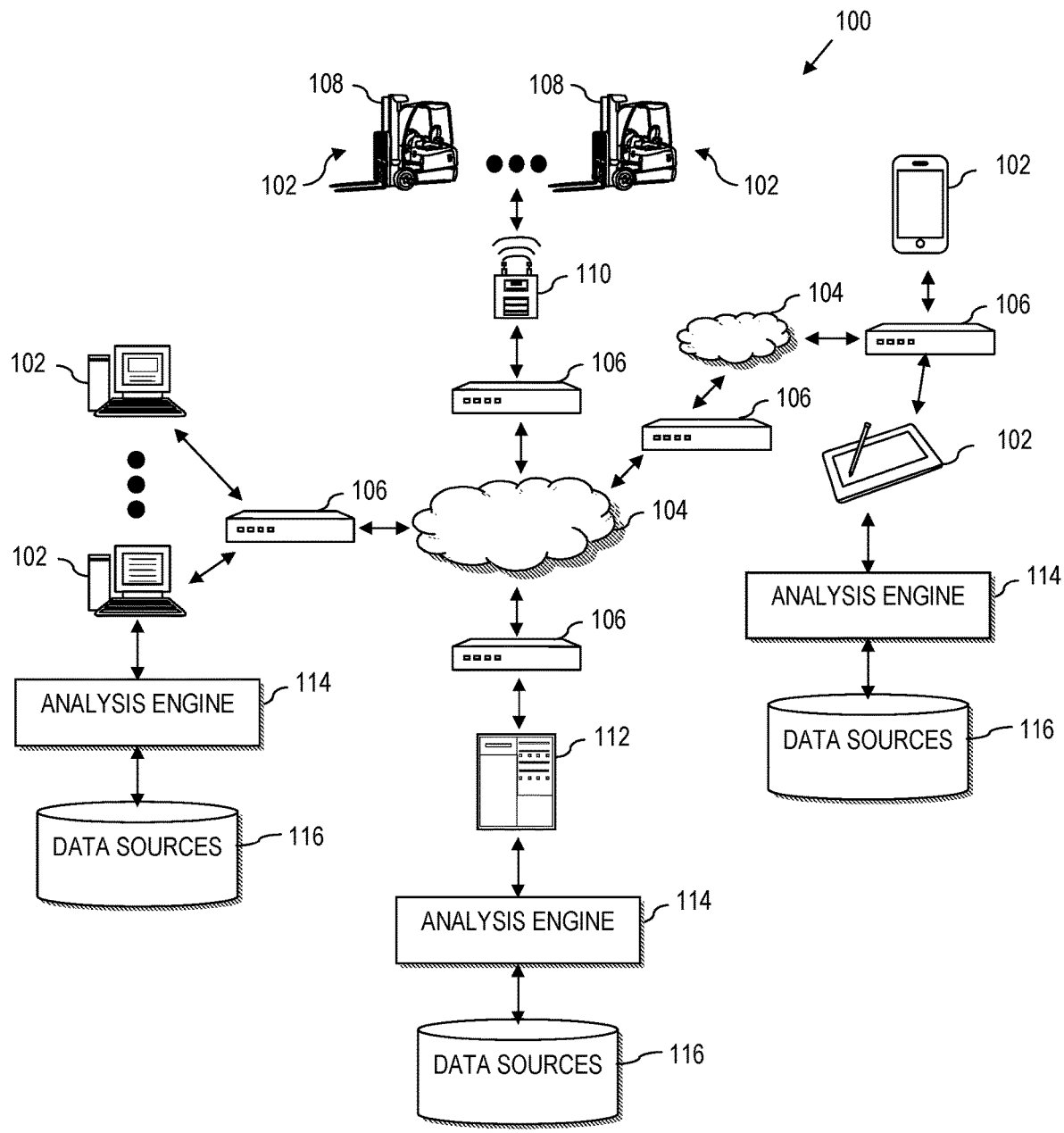
FIG. 1 is a block diagram of a system for operating and evaluating industrial vehicles, according to aspects of the disclosure.

According to various aspects of the present disclosure, systems, methods, and computer-implemented processes provide tools and techniques to evaluate industrial vehicles by simulating industrial vehicle performance. In general, a first process is provided for building a simulation structure that is specifically and uniquely configured for evaluating industrial vehicle performance. Essentially, the first process utilizes a processing engine to build the simulation structure by defining a set of industrial vehicle tasks necessary to characterize the industrial vehicle performance of interest, and by constructing a corresponding kinematic model that models each task represented in the simulation structure (e.g., taking into account movement and energy requirements). The first process also constructs one or more cutback curves that may be utilized by the processing engine to augment the manner in which a simulation is run, as described more fully herein. The processing engine may further build into the simulation structure, one or more workflows, where each workflow represents a piecewise collection of sequential, serialized tasks.

Once a simulation structure is built, a second process is provided for using the simulation structure to run simulations of industrial vehicle performance. Briefly, the processing engine receives a job specification for which industrial vehicle performance is to be evaluated using the simulation. The processing engine extracts a job from the job specification, and aggregates together, a piecewise collection of sequential, serialized workflows so as to characterize the extracted job. The serialized workflows characterizing the job are then processed against the simulation structure by applying the kinematic model to the tasks defining each included workflow. Where applicable in the simulation, one or more cutback curves may also be applied to modify the simulation results. Industrial vehicle performance is derived from the simulation results.

The simulation environment herein is dynamic, such that a job specification can influence and even dynamically alter the simulation structure. In some instances, the job specification can dictate that an entirely new simulation structure is constructed. As such, the job specification or aspects thereof, can serve as feedback to the creation or modification of the simulation structure. Likewise, the simulation structure can dictate aspects of the job specification, thus further facilitating the interaction between the process of creating the simulation structure and the process of using the simulation structure. Also, the job specification can be scaled, such as by job, time, number of industrial vehicles, etc. That is, the simulation structure can be used to simulate a single job for a single industrial vehicle (e.g., a particular putaway operation carried out by industrial vehicle X), or the simulation structure can be used to evaluate a set of jobs performed by an industrial vehicle or fleet of industrial vehicles across a shift, week, month, year, etc.

Yet further, the simulation structure provides the ability to test (in a virtual environment) the effectiveness of new or optional vehicle features (e.g., to decide whether to modify existing industrial vehicles), to test vehicle functions (e.g., to decide whether or not to blend for a certain job, to test whether an industrial vehicle is suitable to accomplish a job, etc.), to measure vehicle performance, or a combination thereof. In this regard, the simulation structure uniquely enables the ability to compare an existing industrial vehicle against an optimal and/or virtual model.

Additionally, the simulation structure can represent an "ideal" vehicle model, e.g., to model a new, perfectly working industrial vehicle. Alternatively, the simulation structure can represent a "virtual" model of a particular industrial vehicle in a fleet of vehicles. The use of a virtual model of a vehicle itself is useful to account for vehicle age, wear, etc., and facilitates analysis of actual industrial vehicle performance against a model of itself (thus normalizing the results). Yet further, simulations can be conducted using both an ideal model and a virtual model.

As such, the simulation structure can be executed against requirements, constraints, options, etc., to provide insight into industrial vehicle performance. In certain implementations, the results are used to perform a predetermined action load control data into an information linking device of a select industrial vehicle based upon the predetermined action, e.g., to reconfigure an industrial vehicle or otherwise alter the performance thereof, such as to optimize for time; optimize energy, battery charge, battery life, or a combination thereof for the industrial vehicle; optimize energy, battery charge, battery life, or a combination thereof across a fleet of industrial vehicles (such as for a select shift); reduce mechanical stress on the industrial vehicle; balance mechanical stress across a fleet of industrial vehicles; control routing or travel; control blending and/or other industrial vehicle functionality; etc. Yet further, the processing engine can use the simulation structure to impute or otherwise fill in missing information in the job specification, e.g., by solving for variables of a given job, to fill in the route between a start point and an endpoint, etc.

The kinematic model includes components that model the movement of an industrial vehicle according to the defined industrial vehicle tasks. The kinematic model can also include an energy consumption model that models vehicle energy characteristics of the simulated industrial vehicle in carrying out the tasks. Additionally, cutback curves are generated. The cutback curves take constraints or other limitations into consideration, including by way of example, vehicle capabilities, automation/semi-automation features, environmental constraints including particular geo-constraints, operational constraints, operator constraints, etc., that are used to augment simulation results under corresponding conditions. For instance, when simulating a task in one region of a warehouse, a select cutback curve may be applied, whereas in a different part of a warehouse, that same cutback curve is not relevant.

In this manner, the cutback curves modify vehicle performance parameters for one or more kinematic functions while executing an assigned task. Thus, as a few examples, cutback curves can be used to account for environmental conditions (such as end-of-aisle control), operational conditions (e.g., warehouse policy choice setting a speed limit in an aisle), vehicle operating state conditions (e.g., limiting speed as a function of fork height), characteristics of the vehicle operator (based upon the level of skill, certifications, etc.), vehicle configuration state (e.g., to account for reduced speed implemented by automation control), combinations thereof, etc.

The disclosure herein improves the technology of industrial vehicles themselves. The disclosure herein also improves the technology of industrial vehicle monitoring, operation, and control. The disclosure herein further improves the technology of industrial vehicle performance simulation and evaluation, resulting in predictive vehicle performance not otherwise available. In particular, various aspects of the present disclosure address the technical problem of industrial vehicle performance, adjustment, and evaluation. The technical solution comprises a computer-generated evaluation and/or simulation that accounts for the complex nature of energy consumption (which can vary greatly based upon the manner in which the industrial vehicle is used), when evaluated against kinematic performance (including capability and suitability for an anticipated application), and environmental conditions or constraints as set out in greater detail herein.

The results of the industrial vehicle performance evaluations herein perform technical functions typical of modern engineering work, by providing a realistic prediction (or verification) of the performance of an actual industrial vehicle under real-world conditions by evaluating industrial vehicle energy consumption and kinematic performance. This allows industrial vehicles to be developed, tuned, and optimized for use directly in their intended environment.

The technical solutions herein allow, for instance, an industrial vehicle manufacturer to effectively determine a likelihood that a number of industrial vehicles in a fleet (with optional technology included) would be able to handle a predetermined throughput of the operation in an environment such as a warehouse, before the industrial vehicles are actually deployed. Moreover, for industrial vehicles that are currently deployed, the disclosure herein provides industrial vehicle evaluations that would otherwise be impossible, by providing the ability to detect even de minimis variances from ideal performance (in terms of energy, kinematic response, or a combination thereof), allowing the industrial vehicle to be adjusted in its role to better utilize its capabilities, or to tune or electronically modify the performance capabilities of the industrial vehicle to acquire/re-acquire a more close to optimal performance capability.

The technical solutions herein moreover, bring about a technical significance of improved industrial vehicle evaluation and/or simulation, along with increased speed of simulation, enabling a wide range of configurations to be virtually tested and examined for suitability before the time and expense of deploying one or more industrial vehicles into an environment. Without the technical solutions herein, advanced verification of industrial vehicle performance, including measures of fitness for an application, kinematic response (including speed of operation), and consumption versus conservation of energy, including complex combinations thereof, would be otherwise impossible. From the technical solutions herein, complex scenarios can be evaluated before deployment, resulting in qualified selection from many different fleet configurations/environment configurations.

System Overview:

Referring now to the drawings and in particular to FIG. 1, a system 100 is illustrated according to various aspects of the present disclosure. The illustrated system 100 is a special purpose (particular) computing environment that includes a plurality of hardware processing devices, designated generally by the reference 102, which are linked together by one or more network(s), designated generally by the reference 104.

The network(s) 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (WiFi), the Internet, including the world wide web, cellular and/or other arrangements for enabling communication between the processing devices 102, in either real time or otherwise (e.g., via time shifting, batch processing, etc.).

A processing device 102 can be implemented as a server, personal computer, laptop computer, netbook computer, purpose-driven appliance, special purpose computing device and/or other device capable of communicating over the network 104. Other types of processing devices 102 include for example, personal data assistant (PDA) processors, palm computers, cellular devices including cellular mobile telephones and smart telephones, and tablet computers.

Still further, a processing device 102 is provided on at least one industrial vehicle 108, such as a forklift truck, reach truck, stock picker, turret truck, tow tractor, rider pallet truck, walkie stacker truck, etc. In the example configuration illustrated, the processing device 102 on each industrial vehicle 108 wirelessly communicates through one or more access points 110 to a corresponding networking component 106, which serves as a connection to the network 104. Alternatively, the industrial vehicles 108 can be equipped with WiFi, cellular or other suitable technology that allows the processing device 102 on the industrial vehicle 108 to communicate directly with a remote device (e.g., over the networks 104).

One or more of the industrial vehicles 108 can also include optional environmental based location tracking, which allows position determination of the industrial vehicle 108, even when operating indoors where a traditional global positioning system (GPS) is ineffective. As will be described in greater detail herein, environmental based location tracking can be utilized to effectively map and track the location of an industrial vehicle 108 in a dimensionally constrained environment, e.g., a mapped portion of a warehouse.

The illustrative system 100 also includes a server 112 (e.g., a web server, file server, and/or other processing device) that supports domain-level data management and processing within an environment. For instance, the server 112 may interact with the industrial vehicles 108 to exchange data, facilitate messaging, control, provide domain-level resources to industrial vehicles, and store data related to industrial vehicle encounters with geo-features, captured events, combinations thereof, etc., as described in greater detail herein.

As noted in greater detail herein, industrial vehicle performance is evaluated using a simulation structure. In this regard, at least one processing device 102 includes an analysis engine 114 and corresponding data sources (collectively identified as data sources 116). In a first example implementation, the analysis engine 114 and corresponding data sources 116 are executed by the server 112. In an alternative example implementation, the analysis engine 114 and corresponding data sources 116 are executed by a computer, or a portable device, e.g., a tablet computer, other ambulatory computing device, a processing device 102 on a corresponding industrial vehicle 108 itself, etc. In yet a further example implementation, the process is distributed, e.g., so as to take advantage of a deeper, richer data set from data sources 116 accessible by the server 112, as augmented by local data stored on a remote device 102, e.g., a tablet computer, a desktop computer, a processing device 102 on a corresponding industrial vehicle 108 itself, etc.

For instance, when implemented on a hand-held portable device such as a tablet, processes herein can be executed using a Model View Controller architecture for implementing the user interface. Moreover, the processes herein can be executed in the form of a passive model and stateless controller. Because a user interacting with a corresponding graphical user interface is not creating any new data only selecting a configuration, the model is passive and immutable. In alternative configurations, the processes herein may dynamically compute some or all aspects of the evaluations. Such computations can even be performed on the fly, such as when implemented (at least in part) on a processing device 102 on an industrial vehicle 108.

Figure 2:
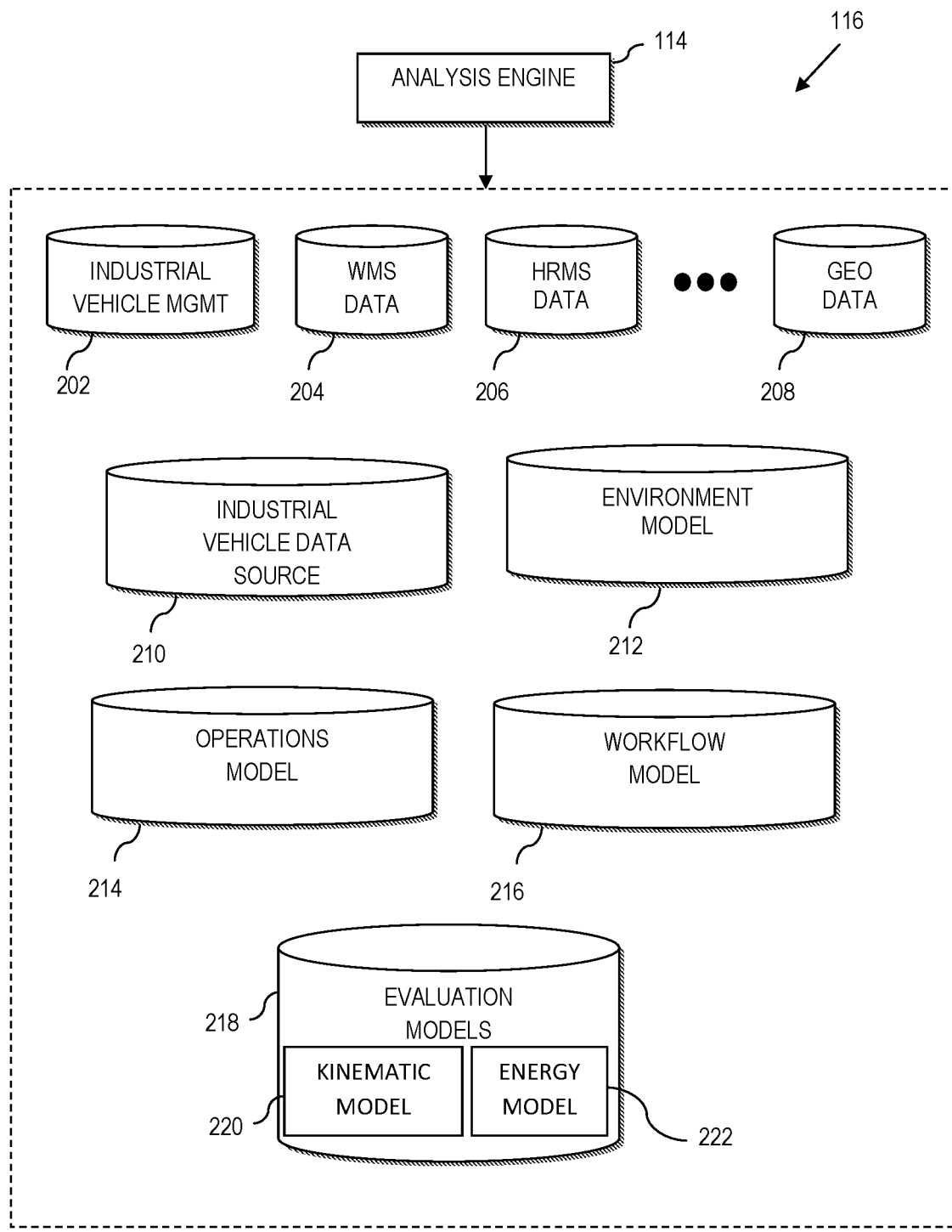
FIG. 2 is a block diagram of a data store of FIG. 1, according to aspects of the disclosure.

Referring to FIG. 2, in an exemplary implementation, the data sources 116 include a collection of databases that store various types of information. Depending upon the manner of implementation, one or more of the described data sources may not be required. Moreover, these data sources 116 need not be co-located. In the illustrative example, the data sources 116 include databases that tie processes executing for the benefit of the enterprise, from multiple, different domains.

In the illustrated example, data sources 116 include an industrial vehicle management data source 202 (supporting processes executing in an industrial vehicle operation domain, e.g., by interacting with an information linking device on an industrial vehicle 108 as described with reference to FIG. 3), a warehouse management system (WMS) 204 (supporting processes executing in WMS domain that relate to movement and tracking of goods within the operating environment), a human resources management system (HRMS) 206 (supporting processes executing in an HRMS domain), a geo-feature management system 208 (supporting processes that utilize environmental based location tracking data of industrial vehicles in a geo-domain), etc. The above list is not exhaustive and is intended to be illustrative only.

Still further, the data sources include an industrial vehicle data source 210. The industrial vehicle data source 210 defines industrial vehicle-related data that impacts the industrial vehicle's dynamics or energy consumption, which can be used by the processes herein, along with the configuration parameters that the industrial vehicle-related data depend on. Notably, some parameters may be defined as "Fixed". As another example, some parameters may hold different values depending upon whether the industrial vehicle is loaded or unloaded. By distinguishing options within a given condition, the processes can apply different processing techniques (e.g., linear interpolation, statistical analysis, etc.) in order to obtain a value to be used.

An example implementation defines one or more category of parameters, e.g., Traction, Hoist, Load Handler, Battery, and Cutbacks. In practice each category of parameters will have multiple parameters/variables. Notably, the parameter categories encompass both energy measures and kinematic measures. By way of example and not by way of limitation, a Traction category can include variables such as (maximum) rate of acceleration, battery current drawn for acceleration, maximum speed, battery current drawn to maintain the (maximum) speed, maximum rate of deceleration, battery current drawn to achieve a (maximum) rate of deceleration, etc. In this example, when simulating a traction function that is less than a maximum value, appropriate simulation results can be obtained by scaling the maximum value based upon a predetermined curve, through interpolation, averaging, or thorough some other function.

Basically, a parameter can be defined for any feature, capability, limitation, or specification of an industrial vehicle. Because different industrial vehicle types have different characteristics and capabilities, an exhaustive list of parameters is not provided herein. Notably, in certain implementations, the information stored in the industrial vehicle data source 210 represent ideal/optimal parameter values for a type of industrial vehicle, e.g., all sit-down counterbalance trucks share the same parameters. In alternative configurations, the parameter values can be stored as a specific instance of a particular industrial vehicle. Here, differences in parameter values within the same vehicle type can account for, and distinguish new vehicles configured with different configurations, old vehicles with old batteries, etc. The differences in parameter values can also represent differences actually measured by vehicle instances currently existing within a fleet, e.g., as measured by the information linking device on an industrial vehicle as explained more fully with reference to FIG. 3.

The data sources can also include an Environmental Model 212 (also referred to herein as a Warehouse Model). The Environmental model 212 may alternatively be part of the geo-data 208. Regardless, the Environmental model 212 defines a map of a dimensionally constrained environment, e.g., includes a mapped portion of a warehouse.

In another example implementation, the Environmental model 212 includes a map of a warehouse (or at least a portion of the warehouse where industrial vehicles operate). The Environmental model 212 also maps the dimensions of the racking structure for storing items such as pallets of goods, inbound and outbound slots/lanes, travel lanes, aisles, worker walkways, etc. In this regard, the Environmental model 212 can optionally include simulated/expected weight/dimensions of products stored in the racking. The Environmental model 212 may also link with the WMS data 204 to allow the analysis engine 114 to obtain actual weights and product dimensions from the state of live inventory. In yet further alternatives, the Environmental model 212 can store a combination of virtualized information as well as actual live information, thus enhancing the flexibility of the processes, simulations, and analysis explorations that can be carried out. The Environmental model 212 can also include environment-based operational constraints, such as end of aisle control specifications, speed limits, define restricted zones, permitted zones, geo-zones, etc.

An Operations Model 214 is provided to describe how operators use the industrial vehicles, how operator shifts are structured and how much product the operators move. As with the other models described with reference to FIG. 2, the included data can be virtual, ideal, actual, or a combination thereof, e.g., by collecting actual information from the HRMS data 206 (which may also/alternatively include LMS data).

A data source can also store workflow parameters 216 that are used to construct a workflow model 216. In an illustrative example, the workflow parameters describe how workflows are executed in an aisle, such as the direction of travel and the ordering and number of locations in a stock picking workflow, etc. Examples of workflow parameters used to create a workflow model 216 are set out in greater detail herein.

Yet further, the data sources include evaluation models 218. As will be described in greater detail herein, the evaluation models 218 include a kinematics model 220. In an illustrative example, the kinematics model is comprised of a drive model, a raise model (or a drive and raise model), a load handler traverse model, a pivot model, etc. The evaluation models 218 also include an industrial vehicle energy consumption model 222. The kinematics model 220 and the energy consumption model 222 can be derived from data collected into the data sources 116, e.g., via the industrial vehicle data source 210, etc.

As noted in greater detail above, the models within the evaluation models 218 can include virtualized information, actual measured information as captured from a corresponding fleet of industrial vehicles, or a combination thereof.

Figure 3:
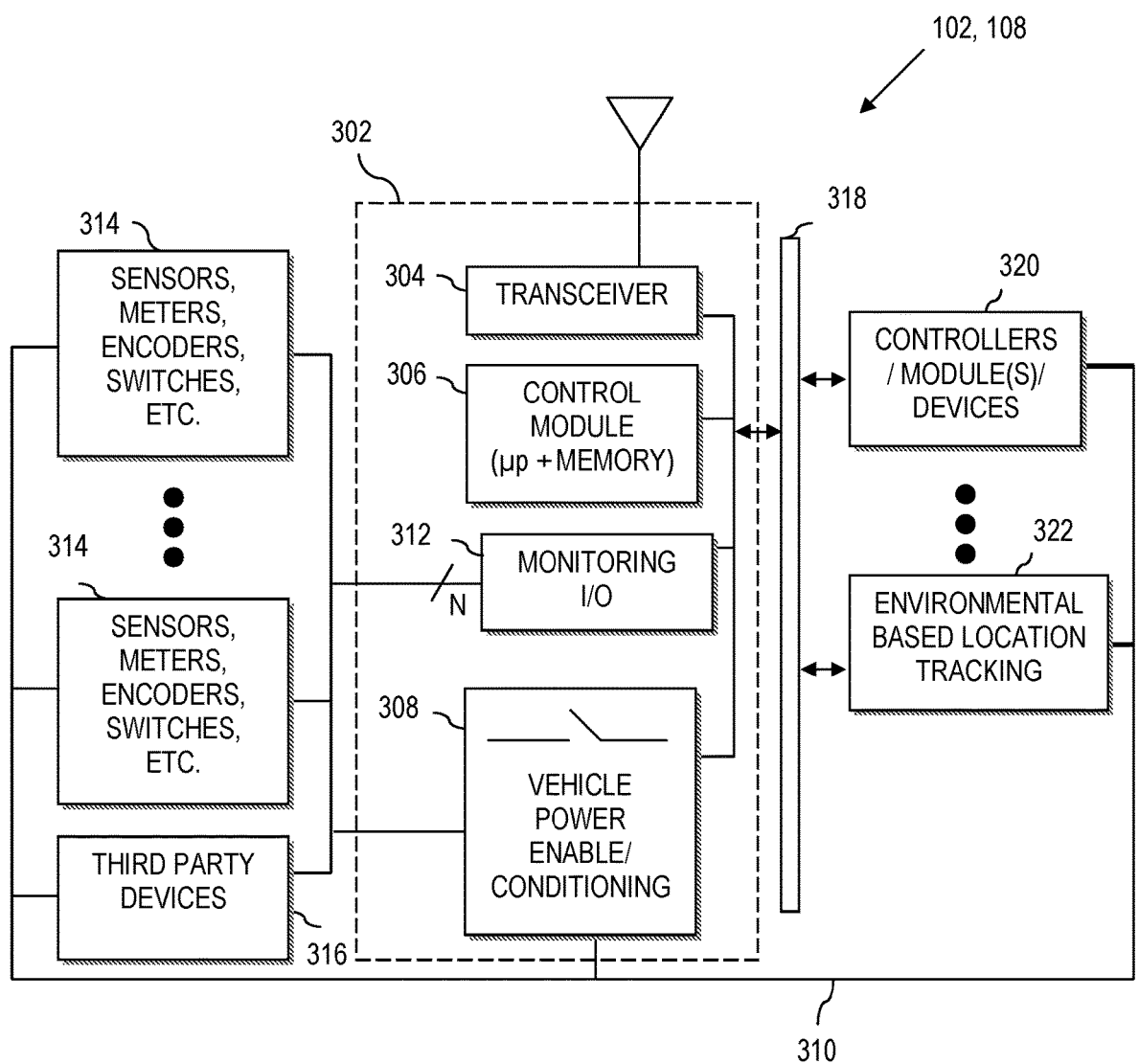
FIG. 3 is a block diagram of a system of electronics on an industrial vehicle such as a forklift truck, which includes an information linking device, and an environmental based location tracking system according to aspects of the present disclosure.

Industrial Vehicle:

Referring to FIG. 3, a processing device 102 is implemented as a special purpose, particular computer, referred to herein as an information linking device 302 that mounts to or is otherwise integrated with the industrial vehicle 108 (FIG. 1).

The information linking device 302 comprises the necessary circuitry to implement wireless communication, data and information processing, and wired (and optionally wireless) communication to components of the industrial vehicle 108. As a few illustrative examples, the information linking device 302 includes a transceiver 304 for wireless communication. Although a single transceiver 304 is illustrated for convenience, in practice, one or more wireless communication technologies may be provided. For instance, the transceiver 304 communicates with a remote server, e.g., server 112 of FIG. 1, via 802.11.xx across the access points 110 of FIG. 1. The transceiver 304 may also optionally support other wireless communication, such as cellular, Bluetooth, infrared (IR) or any other technology or combination of technologies. For instance, using a cellular to IP bridge the transceiver 304 can use a cellular signal to communicate directly with a remote server, e.g., a manufacturer server across a network.

The information linking device 302 also comprises a control module 306, having a processor coupled to memory for implementing computer instructions, including the actions related to the methods and processes, or aspects thereof, as set out and described more fully herein. The control module 306 communicates with native electronic components of the industrial vehicle making the information linking device 302 a particular machine different from a general purpose computer. For instance, the control module 306 utilizes the transceiver 304 to exchange information with a remote server 112 (FIG. 1) for controlling operation of the industrial vehicle 108, for remotely storing information extracted from the industrial vehicle, etc.

The information linking device 302 further includes vehicle power enabling circuitry 308 controlled by the control module 306 to selectively enable or disable the industrial vehicle 108 or select components thereof. For instance, the control module 306 can control the industrial vehicle power enabling circuitry 308 to provide power to select components of the industrial vehicle 108 via power line 310, e.g., based upon operator login, detected geo-features, etc.

Still further, the information linking device 302 includes a monitoring input output (I/O) module 312 to communicate via wired or wireless connection to peripheral devices attached to or otherwise mounted on the industrial vehicle 108, such as sensors, meters, encoders, switches, etc. (collectively represented by reference numeral 314). The module 312 may also be connected to other devices, e.g., third party devices 316 such as RFID scanners, displays, meters or other devices. This allows the control module 306 to obtain and process information monitored on the industrial vehicle 108.

The information linking device 302 is coupled to and/or communicates with other industrial vehicle system components via a suitable vehicle network bus 318. The vehicle network bus 318 is any wired or wireless network, bus or other communications capability that allows electronic components of the industrial vehicle 108 to communicate with each other. As an example, the vehicle network bus 318 may comprise a controller area network (CAN) bus, Local Interconnect Network (LIN), time-triggered data-bus protocol (TTP) or other suitable communication technology.

As will be described more fully herein, utilization of the vehicle network bus 318 enables seamless integration of the control module 206 and other components of the information linking device 302 into native electronics of the industrial vehicle 108. In the example configuration, the control module 306 of the information linking device 302 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 320).

Environmental-Based Location Tracking

According to yet further aspects of the present disclosure, in the example application, an environmental based location tracking device 322 is provided on the industrial vehicle 108. In other implementations, the environmental based location tracking device 322 is optional and need not be included. As illustrated, the environmental based location tracking device 322 is connected to the vehicle electronics via the vehicle network bus 318 (e.g., CAN bus). As a result, the environmental based location tracking device 322 can communicate directly with the control module 306, as well as controllers and other modules 320 of the corresponding industrial vehicle 108. The environmental based location tracking device 322 enables the industrial vehicle 108 to be spatially aware of its location within a dimensionally constrained environment, e.g., a mapped portion of a warehouse.

In the applications described more fully herein, a conventional technology such as a global positioning system (GPS) is not likely to be effective when the industrial vehicle 108 is operated indoors. However, the environmental based location tracking device 322 can comprise a local awareness system that utilizes markers, including RFID, beacons, lights, or other external devices to allow spatial awareness within the warehouse environment. The environmental based location tracking system 322 may also/alternatively use transponders and a triangulation calculation to determine position. Yet further, the environmental based location tracking system 322 can use combinations of the above and/or other technologies to determine the current (real-time) position of the industrial vehicle. As such, the position of the industrial vehicle can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental based location tracking system 322 can also use knowledge read from inertial sensors, vehicle sensors, encoders, accelerometers, gyroscopes, etc., (e.g., via the controllers 320 across the vehicle network bus 318, via sensors 314 across the monitoring I/O 312 and vehicle network bus 318, etc.) to determine the position of the industrial vehicle 108 within the warehouse and/or to augment or modify the position determination from the location tracking device 322. In this manner, the location based tracking system is aware of the absolute position of the vehicle within a dimensionally limited environment, e.g., a mapped portion of a warehouse (e.g., as maintained by the geo-data 208 and/or environment model 212 of FIG. 2.

Simulation Structure Including Flow Overview

Figure 4:
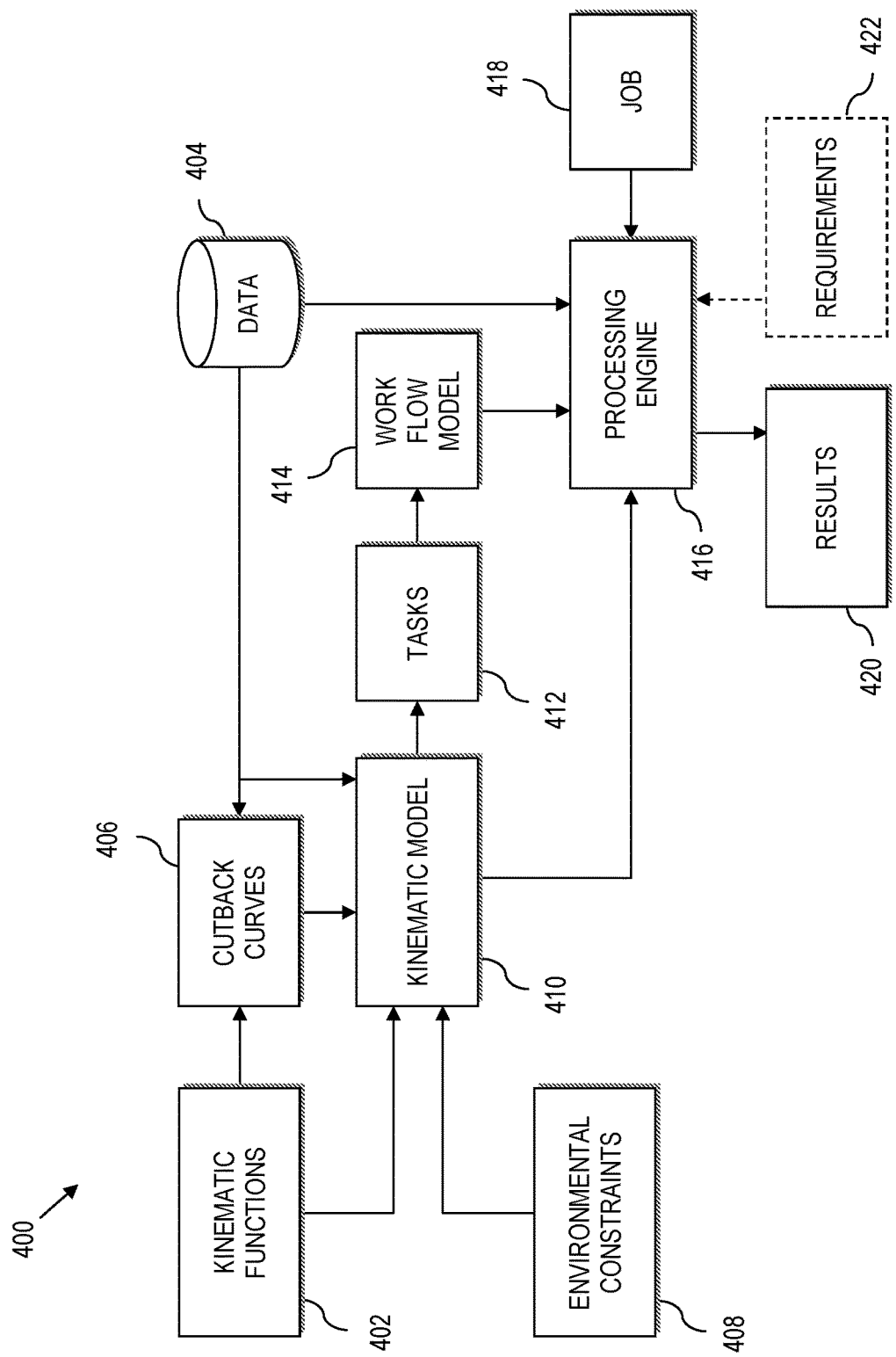
FIG. 4 is a block diagram of a flow for creating and using kinematic models of industrial vehicles and workflow models to evaluate an industrial vehicle based on a job specification, according to aspects of the present disclosure.

FIG. 4 is a block diagram that illustrates a general flow of technical features that are utilized to build a simulation structure for evaluating industrial vehicle performance. Once a simulation structure is built, the system can utilize the simulation structure to execute simulations. Likewise, a job specification can influence how the simulation structure is built. The computer-executed processes of FIG. 4 can be executed by a hardware processor coupled to physical memory, where the processor is programmed by program code stored in the memory, to perform the processes herein. By way of example, the system of FIG. 4 can be executed by one or more instances of the analysis engine 114 on a corresponding processing device 102 (e.g., server, tablet, industrial vehicle processing system, etc.) using data sources 116 as set out in greater detail herein. The processing can be carried out on one physical computing device, or the processes can be distributed across multiple physical computing devices, e.g., in a client-server manner (e.g., a tablet or processing device on an industrial vehicle communicating with a server computer). The computer-executed processes of FIG. 4 can be implemented on computer-readable hardware that stores machine-executable program code, where the program code instructs a processor to implement the described computer-executed processes.

In this regard, the block diagram of FIG. 4 will first be described from the "ground up" to show how a simulation structure is created. Then, the block diagram of FIG. 4 is described to illustrate non-limiting examples of using the created simulation structure to simulate industrial vehicles carrying out various tasks.

Building a Simulation Structure

As illustrated in the block diagram 400, in order to build a simulation structure, kinematic functions 402 are defined, which characterize a range of kinematic capabilities that an associated industrial vehicle can carry out. In practical applications, some of the kinematic functions will be vehicle and/or vehicle type specific. In an example implementation, the kinematic functions include categories of driving, raising/lowering the load handling feature of the vehicle (e.g., the forks), load handler traversing (e.g., which are present on a large man-up industrial vehicle, such as a turret stock picker) and pivoting functions (e.g., rotating the direction of the load handling feature (e.g., forks) relative to the operator's compartment).

Parameters associated with the kinematic functions 402, other data from the data sources 404 (e.g., data source 116 of FIGS. 1-2), or a combination thereof, are used to create cutback curves 406 that can potentially modify certain instances of kinematic functions 402 during the execution of a simulation. As noted herein, cutback curves 406 may be utilized by the processing engine 416 to augment the manner in which a simulation is run. As such, where applicable in the simulation, one or more cutback curves 406 may be applied to modify the simulation results.

Figure 8:
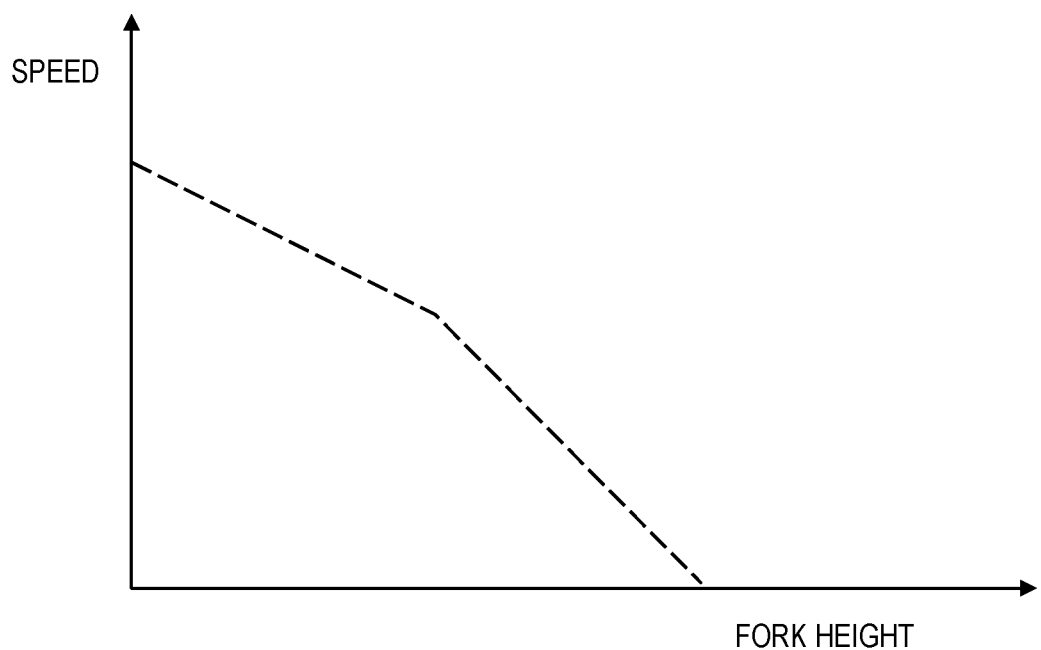
FIG. 8 is a graph illustrating an example curve of speed based on fork height while an industrial vehicle is braking, according to aspects of the present disclosure.
Figure 9:
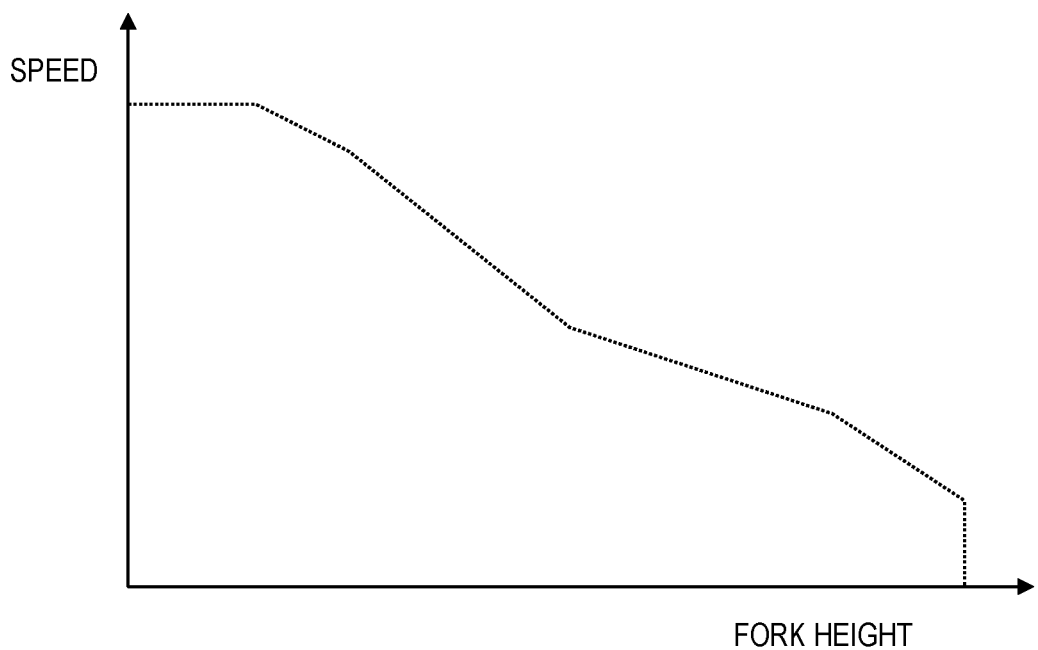
FIG. 9 is a graph illustrating an example curve of speed based on fork height while an industrial vehicle is performing normally, according to aspects of the present disclosure.
Figure 10:
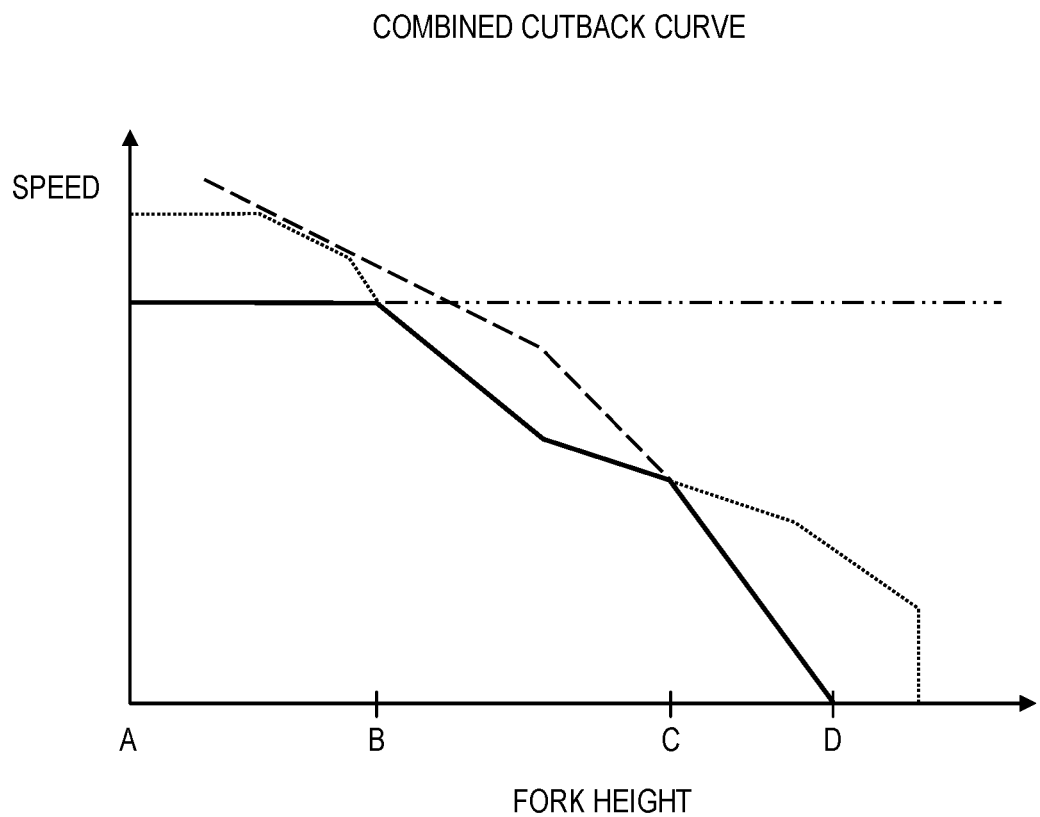
FIG. 10 is a graph illustrating an example cutback curve for speed based on fork height, according to aspects of the present disclosure.

Cutback curves 406 are described in greater detail with regard to FIGS. 8-10. However, briefly, each cutback curve 406 is computed for a designated parameter of a select kinematic function of the industrial vehicle. For instance, in an illustrative example, a kinematic function can be "drive", or "drive and raise" (where travel and fork height are combined). In this example, the designated parameter may be travel speed, fork height, braking, etc. The designated parameter is then linked with one or more related parameters, which may be in one or more dimensions.

A cutback curve 406 can be derived from one or more constraints of an environment in which the industrial vehicle operates, e.g., as extracted from the data sources 404. For instance, a cutback curve can establish speed versus distance constraints by defining a speed envelope. In a first illustrative implementation, an entire aisle of a warehouse is represented by a total path distance on the abscissa of a speed vs distance cutback curve. An environmental end of aisle control (EAC) specifies a speed zone in the ends of the warehouse aisle. As such, the abscissa is represented by a first segment defining a start of aisle EAC distance, a second segment (the middle of the length of the aisle) designating no speed restriction distance, and a third segment defining an end of aisle EAC distance. The ordinate represents speed. A line representing the maximum EAC speed and a line representing the vehicle maximum speed are identified, and a plot is generated. Assuming the vehicle is at rest, the plot represents the maximum (or some other programmed) rate of acceleration of the vehicle to the maximum EAC speed. The vehicle is then speed restricted until reaching the end of the first EAC zone. The vehicle can then accelerate up to the maximum speed, but must begin braking to enter the end of aisle EAC zone at a speed that does not exceed the EAC speed limit. This cutback curve can be linked to a geo-location, e.g., coordinates X, Y, corresponding to the end of aisle 1. Moreover, this cutback curve can by dynamically modified. For instance, fork height may affect the rate of acceleration, the weight of a simulated load can alter the rate of braking, etc. Moreover, this cutback curve can be linked to a specific vehicle, vehicle type, operator, set of coordinates, specific period of time (e.g., only during first shift), etc.

Yet further, this cutback curve can be implemented as a "combined" cutback curve. For instance, operator training may impose a speed restriction on the vehicle that is greater than the maximum allowable EAC speed, but less than the maximum vehicle speed. In this manner, a combined cutback curve is generated by plotting each cutback curve on a common coordinate axis, and by selecting a minimum of the plotted cutback curves at points along the common coordinate axis (the abscissa in this example). This simplified example is presented for illustrative purposes only. In practice, cutback curves, including combined cutback curves can be generated for any kinematic function parameter, using multiple dimensions.

As another example, a blending operation (i.e., the simultaneous performance of two or more truck functions, such as travel at the same time as fork height adjustment) can be modified by a fork height cutback curve generated for speed (ordinate) as a function of fork height (abscissa). Again, one or more constraints of an environment in which the industrial vehicle operates can be received, e.g., from the data sources 404, to add multiple curves and/or dimensions to the speed vs. fork height curve. For instance, the height cutback can be geo-limited, limited by time, operator skill, nature of the goods on the forks (e.g., derived from the WMS system), etc. Fork height cutback can also be expressed in terms of time, distance, or other measures. Yet further, a combined height cutback can be defined as the minimum of the points of two or more curves along a common coordinate axis of the combined cutback curve.

Cutbacks can further be derived for braking, performance, battery/energy, etc. Yet further, it is possible that at a particular geo-location, two or more cutback curves will be applicable. In this example, the cutback curves themselves are combined and an overall cutback is taken as by selecting the minimum of the combined curves at points along each common coordinate axis. In complex examples, this concept can be applied along multiple common axes in multiple dimensions.

The kinematic functions 402, the cutback curves 406, the data sources 404, and environmental constraints 408 are used to create a kinematic model 410 of an industrial vehicle. Typically, the environmental constraints 408 can be stored with the data sources 404, but are shown broken out here solely for clarity of discussion to identify their function in informing the kinematic model 410. In this manner, the kinematic model 410 of an industrial vehicle (or industrial vehicle type) provides a convenient mechanism to describe models of the kinematic functions 402 of the industrial vehicle that can be processed in view of the computed cutback curves 406, environmental constraints 408, or combinations thereof. The kinematic model 410 also includes an industrial vehicle energy consumption model. The energy consumption model allows the simulation to account for energy consumption as a function of task being simulated. The energy consumption model thus complements the kinematic model enabling simulations to focus on energy alone, energy as a function of task performance, task performance as a function of energy, or purely based upon task performance.

In an example implementation, the kinematic model 410 includes a drive and raise model derived from a drive and raise kinematic function. Driving can be simplified to a uniform acceleration model, where unconstrained, the vehicle accelerates at a defined maximum acceleration (set by a drive parameter) to a maximum speed, and likewise decelerates at late as possible to arrive at a speed reduced limit. Alternatively, acceleration, velocity, travel direction, etc., can be dynamic. The drive and raise model can also factor in blending. For instance, in a "no blend" configuration, the forks are raised/lowered to a travel height, the vehicle travels to a destination, stops, then the forks are adjusted to a final height. In a "start blend only" configuration, the vehicle can raise/lower the forks towards a travel height while driving to a final destination. Once at the final destination, the forks are adjusted to the final fork height. In a "blend both" configuration, travel and fork height can be adjusted simultaneously. Here, the final fork height is achieved at the same time as arriving at the destination.

Similar considerations can be applied to other components of the kinematic model 410, e.g., a load handler traverse model, pivot model, and vehicle energy consumption model.

Tasks 412 are defined that can be characterized (optionally solely) in terms of the kinematic model (e.g., based upon one or more kinematic functions and/or the energy consumption model). Analogously, a workflow model 414 is created that can be characterized (optionally solely) in terms of defined tasks 412. In practical applications, the defined tasks 412 can be drawn upon to build any number of workflow models. Moreover, the workflow models should define all of the operations that a user intends to simulate. In certain examples, a workflow can be represented as a serialized group of tasks.

It should be appreciated that in practice, kinematic models can be constructed to model specific industrial vehicles, specific industrial vehicle types, etc. As such, there can be multiple kinematic models 410. Likewise, there are likely to be numerous tasks 412, some of which (e.g., drive) that are common to most all vehicle types. There can also be tasks 412 that are unique to specific vehicles/vehicle types.

In use, a processing engine 416 receives a job specification 418 that characterizes an operation to be simulated. The operation is defined based upon, or can otherwise be deconstructed into, the workflows in the workflow model 414. Moreover, the job specification 418 can describe a travel path (including a start point and an end point) within the environment. Knowledge of the travel path enables environmental constraints to be applied to the simulation in a context appropriate manner. Moreover, the travel path can be used to determine whether (and when during the simulation) to apply one or more cutback curves. In some embodiments, the travel path includes a route for the industrial vehicle to take to get from the start point to the end point. In other embodiments, the travel path does not include the route, and the processing engine 416 determines a route (e.g., based on energy consumed, shortest distance, shortest time, etc.).

The processing engine 416 uses the kinematic model 410 (including the cutback curves 406 and environmental constraints 408), the workflow model 414, and the data sources 404 to simulate the job to produce results 420. When executing the simulation, environmental constraints 408, e.g., a warehouse speed limits are imposed on the vehicle being simulated. Such limits may be geo-based, time/shift/operator-based, etc. Moreover, cutback curves 406 are applied to the simulation as set out more fully herein. For instance, in a height cutback, the vehicle is restricted to slower speeds the higher the forks are. In an example implementation, this relationship is simplified to piecewise linear. The time taken to drive an identified path depends on the constraints so the height cutbacks can be broken into a time from start constraint and a time to end constraint.

In an example implementation, constraints are obeyed reactively, e.g., when simulating a vehicle driving down an EAC equipped aisle, the model will not speed up until it has passed the start EAC distance. Here, the model may begin decelerating once inside the end EAC distance. Alternatively, a look-ahead can cause the vehicle to brake so that the vehicle is at the maximum speed when entering the end aisle EAC zone.

These results 420 can then be used to evaluate an industrial vehicle associated with the kinematic model 410. The "results" 104 could be a simulation result, a fleet estimate result, a comparison of an actual truck to an ideal simulated truck, an energy simulation, a time simulation, etc.

In some embodiments, requirements 422 for the simulation are included. For example, a requirement 422 may be for the processing engine 416 to give energy-based results 420. Another example of a requirement 422 is for the processing engine 416 to solve for a route (e.g., based on time, energy, both, etc.) from the start point to the end point. As shown in FIG. 4, the requirements are separate from the job specification 418. However, in some embodiments, the requirements 422 are included with the job specification 418.

The requirements can also be implemented as constraints. A further example of a requirement 422 may be performance scoring such as, for example, to complete a set of operations (e.g., several putaways and retrievals) within a certain amount of time and/or by consuming less than a certain amount of energy. In practical implementations, limitations may be imposed to ensure that such constraints are theoretically feasible given the available fleet. In this regard, the constraint(s) can also be expressed in a goal-based manner, e.g., minimize time, or minimize energy. Another example of a requirement 422 would can indicate that a certain operation must take place on a certain shift.

Example Simulation

In order to process an example job specification, the processing engine 416 needs to know information about an industrial vehicle being simulated, and information about the environment. The processing engine 416 may also receive information about a hypothetical operator, information about an actual operator, operational information, combinations thereof, etc. This information is extracted from the data sources 404 (i.e., the data sources 116 of FIG. 1 and FIG. 2).

As a simplified yet illustrative example, the job specification can be expressed as "a TSP6000 starts at the end of aisle 1, drives down aisle 1, picks up a pallet from rack 5, slot 3, and moves the pallet to aisle 2, rack 2 slot 1". This job specification can be based upon hypothetical data. The job specification can also be used to simulate an event that actually occurred, e.g., based upon WMS information, industrial vehicle management information, etc. By way of example, during operation, a TSP6000 equipped with an information linking device 302 as described with reference to FIG. 3 operates within a warehouse to implement the above-described job. Here, the travel route and load information can be determined based upon data collected from the environmental based location tracking 222 and other sensors readable by the information linking device 302 (such as RFID, load weight sensors, etc.). The industrial vehicle job can also be determined using data from a WMS (see FIG. 2). Still further, the job specification can be generated based upon a hybrid of hypothetical data and previously measured data.

Regardless, the processing engine 416 identifies the job specification as a single instance of a "Putaway Workflow" 414. The Putway workflow is then in-turn decomposed into relevant tasks 412, e.g.:

Start at a known position (start at the end of aisle 1)
Drive and Raise to an Inbound Slot (drive down aisle 1 and raise to slot 3 at rack 5)
Pivot (if necessary)
Slot Interaction (pick up a pallet from slot 3)
Gain Load
Traverse Out
Drive and Raise (drive to aisle 2, rack 2)
Traverse In
Slot Interaction
Lose Load (drop off load at aisle 2, rack 2, slot 1)
Traverse Out
End at a Rack Slot Notably, each task represents a motion required of the simulated vehicle to carry out the defined job. Likewise, the performance of each task requires the industrial vehicle to expend energy, which is measured by the energy consumption model.

Notably, the tasks are processed in view of warehouse data (e.g., the length of Aisle 1, EAC constraints at the ends of Aisles 1 and 2, etc.), as well as kinematic models that set forth the capabilities of the truck as limited by cutback curves (environmental, operational, or other factors that would otherwise limit maximum optimum performance of the truck). The result is a simulation/estimation of the defined job, e.g., expressed in terms of time, energy, etc. For example, a requirement 422 may be added that requires the processing engine 416 to simulate for energy and report results expressed in terms of energy.

The various "tasks" used by the workflow model(s) are characterized by "task models" 412. The tasks themselves define industrial vehicle work, so the tasks also correspond to the kinematic model 414. For instance, a drive and raise task can be associated with both a drive and raise kinematic model and an energy consumption model. Similarly, a pivot task can be associated with both a pivot kinematic model and an energy model, etc.

The results 420 can be a function as a vehicle estimator, or as a fleet estimator tool. The simulation capabilities expressed in the results 420 can also be used to extend environmental based location tracking devices in existing trucks, provide (real-world vehicle and/or operator) performance scoring and evaluation, warehouse management system planning, predicting maintenance schedules, vehicle configuration, etc.

In several embodiments, the job specification includes all the tasks required for an entire shift of a warehouse. The processing engine 416 can use the models 410, 412, 414 discussed herein to determine an optimal schedule, determine capability, identify fleet requirements, etc., (based on energy, time, or both) of the tasks for an entire shift, for an entire fleet of vehicles, for an entire fleet across an entire shift, etc.

For example, the simulation results for a fleet of three rider reach trucks and four turret stock pickers may indicate that a job specification with four-hundred operations may be spread over three shifts, where the first shift uses three rider reach trucks and two turret stock pickers performing one-hundred-and-fifty of the operations, the second shift uses one rider reach truck and four turret stock pickers performing another one-hundred-and-fifty of the operations, and the third shift uses two rider reach trucks and one turret stock picker to perform the final one-hundred operations.

In some embodiments involving entire fleets, the simulation may cover interactions between vehicles. For example, the simulation may create concurrent routes for three vehicles in the different areas of the warehouse, so there is no extended time for any of the vehicles to wait for another vehicle. For example, the simulation may limit routes and schedule such that one vehicle per aisle of the warehouse, may set the schedule such that a first vehicle is performing a driving function while a second vehicle is interacting with a slot so there is less traffic during a drive function of the first vehicle, etc.

Moreover, in some embodiments, the results 420 of the simulation may be compared to actual vehicle data (e.g., data collected on the vehicle and communicated with an information linking device, FIG. 3) to determine if a kinematic model for a type of vehicle should be updated, if a kinematic model for a select instance of a vehicle should be updated, if the vehicle should be scheduled for maintenance, etc., or combinations thereof.

Creating Jobs for Simulation Based Upon Collected Vehicle Data

With reference to FIGS. 1-4, an industrial vehicle travels around an environment such as a warehouse performing "jobs". A job is an activity performed by the vehicle operator that is carried out as a requirement of the vehicle operator's assigned duties. For instance, a WMS may instruct a vehicle operator to pick up a pallet from Receiving Lane 3, and deliver the pallet to Aisle 1, bay 1. The system herein takes that "job" (specific instance) and breaks it down into a workflow (a Putaway workflow) that is defined by a sequential series of tasks (e.g., pick up, drive, pivot, traverse, drop off). In this regard, the tasks represent unitized measures of work performed by the industrial vehicle.

The information linking device 302 (FIG. 3) constantly (e.g., at preprogrammed intervals) monitors the industrial vehicle and collects data therefrom. The information linking device 302 thus captures the state of the industrial vehicle in time-stamped records that can include information such as the vehicle speed, controller states, sensor measurements, etc. Still further, where an industrial vehicle is further equipped with the environmental based location tracking 322, the location of the industrial vehicle is logged. Moreover, a module 320 on the industrial vehicle can comprise a battery monitor that constantly collects battery state data.

The information linking device 302 can also create records in response to asynchronous triggers, such as an operator logging on/off the vehicle, detected impacts, measurements from the load sensor indicating that the industrial vehicle has picked up or dropped a load, information from the environmental based location tracking device 322 indicating that the industrial vehicle is at a specific location, etc.

The collected data is wirelessly transmitted to the industrial vehicle management data source 202 (FIG. 2). In this manner, the above information can be linked to a specific industrial vehicle, vehicle type, an operator identification, etc.

As such, jobs for simulation can be created by querying data collected in the industrial vehicle management data source 202. For instance, a query can identify, for a specific industrial vehicle, a record indicating that a load is picked up based upon the load sensor reading. Because the location of the industrial vehicle is tracked, this record allows a start point to be created. When the records indicate that the load is dropped off, an end point can be created. In this example, the located start point and end point are selected because they can be mapped to a previously created workflow model 414 (e.g., a putaway operation as described more fully herein). In practice, the created workflow models 414 can be used to query data to create jobs for simulation. Moreover, new workflows can be dynamically created by using the system of FIG. 4 to build new workflow models 414 based upon the queried data.

Keeping with the example above, by evaluating the records between the start point and endpoint, the system determines the weight of the load, the travel route of the industrial vehicle, the industrial vehicle speed, fork height, battery discharge, and other relevant parameters. In alternative configurations, the above approach can be replaced by, augmented by, or otherwise modified by reconciling the above noted query results with queries against warehouse management system (WMS) data 204, which contains information about the movement of items about the warehouse.

The collected information is formulated into a job 418 that is simulated as set out in greater detail herein. In an example implementation, the simulation results and the actual measured job are compared. The comparison generates a performance score that results in an ability to score the actual operation based upon how closely the actual performance monitors the ideal simulated results.

In further examples, noted discrepancies are reconciled. For instance, if the simulation is run on data that reflects an ideal instance of the exact industrial vehicle being simulated, then the results are normalized to that vehicle. This allows potential problems to be quickly identified. By way of example, if the comparison indicates that the actual operator that performed the job lost time due to improper blending, it could be that the operator needs better training or a blending capability programming in the industrial vehicle may have been disabled or otherwise modified. As another example, if the operator actually completed the job faster than the simulation suggests is possible, then the system can evaluate the results to determine the cause. The operator may have traveled too fast through a speed restricted zone. Alternatively, the performance tuning of the actual industrial vehicle may be set to an improper value for that operator. If the performance tuning of the actual industrial vehicle is off, this parameter can be automatically corrected. Thus, the comparison creates a diagnostic tool to remedy vehicle as well as operator-based issues.

As yet a further example, the simulation may augment the actual job (e.g., via requirements 422). For instance, a user can take the start point and endpoint of the job and have the simulation actually solve for a route. The route from the simulation results is compared with the route actually taken to determine whether the operator is following best practices.

In still further examples, the requirements 422 allow the simulation to be dynamically modified. In this example, the start point and end point of the job are programmed to designate the job path. However, the simulation is run to optimize for energy saving, time, or some other factor. When the actual results of the job are compared to the simulated results, a predetermined action can be taken. For instance, if the actual job performance used more energy than the simulation results, it may be because the industrial vehicle is tuned for performance, not energy conservation. As such, the process sends a command back to the information linking device 302 on the industrial vehicle (e.g., via the wireless infrastructure of FIG. 1) to detune the industrial vehicle.

In this regard, as noted in greater detail herein, the processing engine 416 may execute on a server computer, tablet computer, etc. Regardless, the processing engine 416 communicates across the network 104 (FIG. 1) to the industrial vehicle across the wireless infrastructure. In practical applications, this communication may be direct or indirect. For instance, a tablet may be required to send a request to an industrial vehicle server, which can translate, format, perform security screening, etc., on the request before communicating with the industrial vehicle across the wireless infrastructure.

In yet further examples, the simulation can be used as a performance scoring tool to provide feedback during the performance of an operation. In an example implementation, an industrial vehicle performs repetitive tasks across a shift, e.g., putaway operations. Here, the WMS data 204 knows the jobs assigned to a given industrial vehicle across a shift. As such, when a job is complete, the system analyzes the next putaway operation based upon the WMS data. This essentially serves as a "lookahead" of how the vehicle should perform. The simulation results are communicated to the information linking device of the industrial vehicle. As the vehicle operator performs the operation, the actual vehicle data collected by the control module 306 of the information linking device 302 is periodically compared against the actual vehicle performance. This allows feedback to be provided to the operator via a graphical user interface on the industrial vehicle.

In yet further examples, the comparison of simulation results and real performance data can be smoothed, averaged, etc. This allows a more macro-view of the vehicle performance. By aggregating results across multiple iterations of a simulation (e.g., across an entire shift, month, year, etc.) the overall performance of the industrial vehicle can be tracked.

Yet moreover, the actual measurements from industrial vehicle data can be evaluated from time to time to augment the simulation data. For instance, the simulation can include two variations, including a first model of an ideal vehicle, and a second model that more accurately reflects the current state of the actual vehicle. For instance, a vehicle with an old battery is not likely to perform that the same level as a vehicle with a new battery. A vehicle with a smaller battery is not likely to perform at the same level as a truck with a larger battery, etc. Thus, the simulations can run comparisons against a simulated ideal vehicle, or a simulated ideal version of the current state of the actual vehicle, and one or both can be compared against actual vehicle data.

Another example variable can account for "slot interaction", i.e., the time an operator spends at a load pickup or drop off location. In an example implementation, a slot interaction variable is programmed with a value that serves as a best guess/bench mark. In this example, the process engine 416 compares the expected bench mark data assigned to the slot interaction variable with a recorded time that it takes (per occurrence or on average) to perform slot interaction tasks (e.g. barcode scanning). The actual slot interaction time can be estimated based upon WMS entries, and/or by evaluating data collected by the information linking device 302 (FIG. 3) on an industrial vehicle that is suggestive that the operator of the industrial vehicle is engaged in a slot interaction, etc. For instance, by monitoring industrial vehicle data using the information linking device 102, a slot interaction can be inferred by detecting a sequential series of data activities, such as vehicle stop, pivot, traverse, raise/lower, traverse, pivot, drive. The comparison results can be used to modify the benchmark data assigned to slot interaction, thus improving the modeling described herein. The comparison results can also be fed back into other applications, e.g., to provide an automatic labor standard.

Creating the Kinematic Model and Workflow Model

Figure 5:
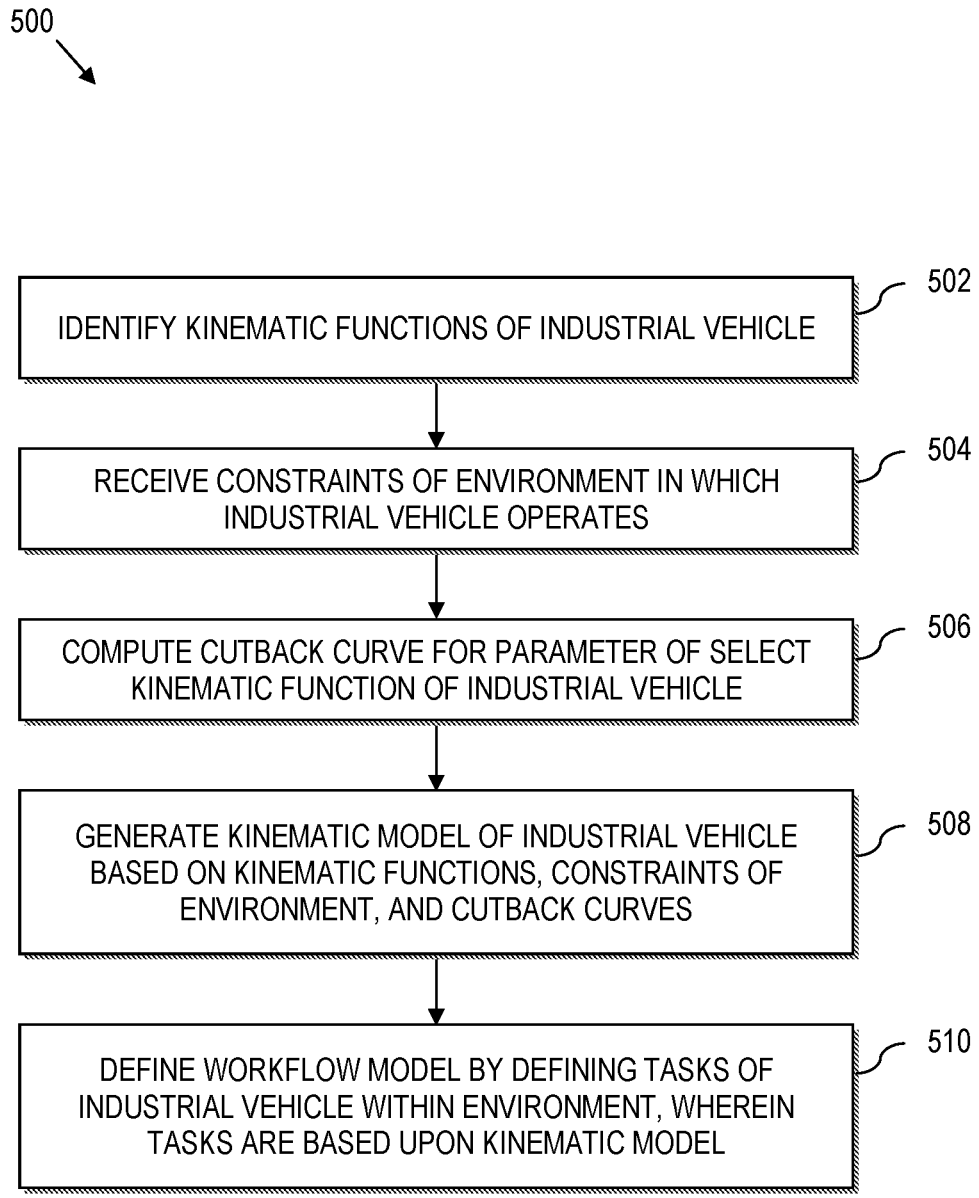
FIG. 5 is a flow chart illustrating a process to generate kinematic models of industrial vehicles and workflow models, according to aspects of the present disclosure.

Turning now to FIG. 5, a process 500 for of evaluating industrial vehicle performance is shown. The computer-executed processes of FIG. 5 can be executed by a hardware processor coupled to physical memory, where the processor is programmed by program code stored in the memory, to perform the processes herein. By way of example, the process of FIG. 5 can be executed by one or more instances of the analysis engine 114 on a corresponding processing device 102 using data sources 116, by the processing engine 416 of FIG. 4, etc. as set out in greater detail herein. The process can be carried out on one physical computing device, or the process can be distributed across multiple physical computing devices, e.g., in a client-server manner. The computer-executed process of FIG. 5 can also be implemented on computer-readable hardware that stores machine-executable program code, where the program code instructs a processor to implement the described computer-executed processes.

In particular, the illustrated process 500 can be used for generating a kinematic model and defining a workflow model as described below. At 502, kinematic functions of an industrial vehicle are identified. For example, kinematic functions characterize the range of kinematic functions that an associated industrial vehicle can carry out. As noted in the example industrial vehicle data source 210 of FIG. 2, kinematic functions can include the categories of driving, raising/lowering, load handler traversing, and pivoting functions. Energy may also be included in the kinematic functions. Of course, the actual capabilities of the physical counterpart will determine the types of kinematic functions that are identified.

However, for sake of example, the driving function may include acceleration to a maximum speed, going a certain distance, and decelerating to a stop (i.e., a uniform acceleration model). The raising function may include a uniform speed model where the forks, cabin, or both of the industrial vehicle are raised. Further, the traverse function may be a uniform speed maneuver that indicates that the industrial vehicle is moving toward a specific object (e.g., a pallet to be picked). Moreover, the pivot function may include turning the industrial vehicle to transition between a drive/raise function to a traverse/raise function or vice versa. Also, the identified functions may include timing aspects (i.e., time to perform a function), energy aspects (i.e., current consumed for a function), etc.

The functions may be performed concurrently or may be mutually exclusive. For example, the drive and raise functions may be performed simultaneously in a "blending" operation. In other words, the raise function may start while the industrial vehicle is driving to the desired location. Blending may comprise a "start blend" where the simulation is to raise/lower towards a travel height while driving to a final location, and once at the desired location, the simulation completes the raise/lower operation to a final desired height (even if not at travel height yet). Comparatively, in a "full blend", a raise/lower operation is blended with travel to the final height such that the final height will be reached at the same time as arriving.

On the other hand, if the drive and raise functions are mutually exclusive, the raising function may not be performed while the industrial vehicle is performing the driving function and vice versa. This is effectively achieved in a combination drive and raise model by defeating blending, i.e., no blending permitted. Data for the kinematic functions may be obtained from an industrial vehicle data storage, as discussed above, e.g., via hypothetical/ideal data, actual vehicle measurements, or via a combination thereof.

At 504, constraints of an environment in which the industrial vehicle operates are received. Constraints can be extracted in relation to the environment (e.g., from the Environment model 212 of FIG. 2), from operations (e.g., the Operations model 214 of FIG. 2), based upon vehicle constraints (such as vehicle performance tuning described in the industrial vehicle data source 210 or industrial vehicle management data 202 of FIG. 2), or based upon operator limitations (e.g., as extracted from the industrial vehicle management data source 202, HRMS/LMS data source 206, operations models 214, etc.).

As a few practical examples, environmental constraints may include a maximum speed limit in the environment as a whole, localized speed limits (e.g., speed constraints at ends of aisles), localized speed adjustments (e.g., removing speed constraints), industrial vehicle function adjustments (e.g., turning on work lights within a specific area), etc. Further, a map of the environment (e.g., a warehouse) may include locations of aisles, racks, pallets, etc.

At 506, cutback curves for a parameter of a select kinematic function of the industrial vehicle are computed. For example, a speed parameter of the drive function may be modified or "cutback" based on a height of the cabin/forks of the industrial vehicle. The computation of the cutback curves are discussed in greater detail below.

At 508, a kinematic model of the industrial vehicle is generated based on the kinematic functions, the constraints of the environment, and the cutback curves. For example, the kinematic model of the truck includes models of the kinematic functions of the industrial vehicle that are limited by the environmental constraints and cutback curves. As an illustration, if the maximum speed of the industrial vehicle is five miles per hour, if the environmental constraints include an end-of-aisle constraint of three miles per hour, and if the cutback curve indicates that a fork-height of ten feet allows a maximum speed of two miles per hour, then an industrial vehicle traveling in an end-of-aisle zone with forks raised to ten feet would be limited to two miles per hour, despite the environment and truck capability indicating that a faster travel speed would be otherwise possible.

Basically, the kinematic model of the industrial vehicle allows for a simulation of the industrial vehicle within the environment, which is discussed below.

At 510, a workflow model is defined by defining tasks of the industrial vehicle within the environment, based on the kinematic model of the industrial vehicle. For example, a putaway workflow model may include a serialized set of tasks based on the kinematic model as such:

Putaway
1. Start at a Rack Slot
2. Drive and Raise to an Inbound Slot
3. Pivot, if necessary
4. Traverse In
5. Slot Interaction Putaway Pallet Pick
6. Gain Load
7. Traverse Out
8. Drive and Raise back to the Rack Slot
9. Pivot, if necessary
10. Traverse In
11. Slot Interaction Putaway Pallet Place
12. Lose Load
13. Traverse Out Note that tasks 2 and 8 include blended drive and raise functions, as discussed above. As another example, a retrieval workflow model may include:

Retrieval
1. Start at an Outbound Slot
2. Drive and Raise to a Rack Slot
3. Pivot, if necessary
4. Traverse In
5. Slot Interaction Retrieval Pallet Pick
6. Gain Load
7. Traverse Out
8. Drive and Raise back to the Outbound Slot
9. Pivot, if necessary
10. Traverse In
11. Slot Interaction Retrieval Pallet Place
12. Lose Load
13. Traverse Out In practice, the defined workflows can be as simple or complex as the application dictates. Nevertheless, the various defined workflow models should account for the entire range of activity that an associated industrial vehicle will perform. That is, there should be at least one workflow model that models every movement that an actual associated industrial vehicle is contemplated to make when operating in the environment, e.g., warehouse.

In certain implementations, the results are used to perform a predetermined action load control data into an information linking device of a select industrial vehicle based upon the predetermined action, e.g., to reconfigure an industrial vehicle or otherwise alter the performance thereof, such as to optimize for time; optimize energy, battery charge, battery life, or a combination thereof for the industrial vehicle; optimize energy, battery charge, battery life, or a combination thereof across a fleet of industrial vehicles (such as for a select shift); reduce mechanical stress on the industrial vehicle; balance mechanical stress across a fleet of industrial vehicles; control routing or travel; control blending and/or other industrial vehicle functionality; etc. Yet further, the processing engine can use the simulation structure to impute or otherwise fill in missing information in the job specification, e.g., by solving for variables of a given job, to fill in the route between a start point and an endpoint, etc.

Evaluating Industrial Vehicles Using the Models

Figure 6:
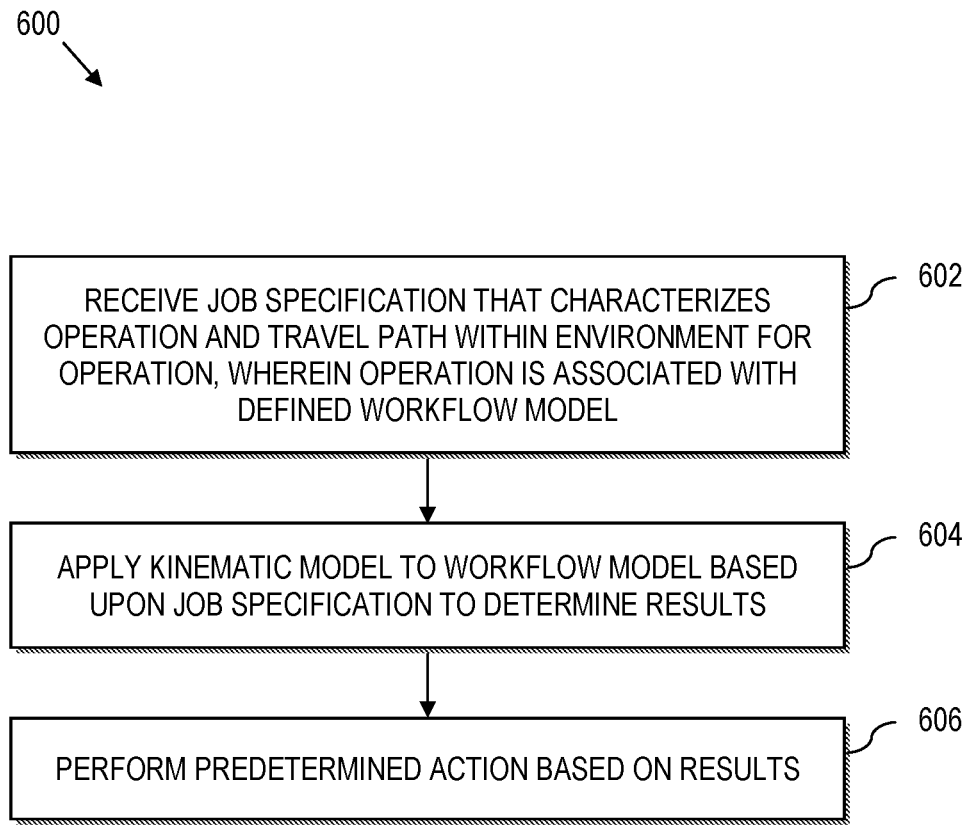
FIG. 6 is a flow chart illustrating a process to evaluate an industrial vehicle based on a job specification based on the kinematic models and workflow models of FIG. 5, according to aspects of the present disclosure.

FIG. 6 illustrates a process 600 for evaluating industrial vehicles based on the kinematic model and the workflow model. At 602, a job specification that characterizes an operation (based on the workflow model) and travel path within the environment for the operation is received. For example, the job specification may be to have an industrial vehicle perform a putaway operation comprising picking up a first load from location A and delivering the first load to location B, then perform a retrieval by traveling from location B to location C, retrieving a second load, and delivering the second load to location D. Any number of operations may be included in a single job specification.

At 604, the kinematic model of the industrial vehicle is applied to the workflow model based upon the job specification to simulate the industrial vehicle in the environment to determine results. Using the example job specification above, the kinematic model and industrial vehicle data is used to determine how much time it would take the industrial vehicle to perform the tasks in the job specification, energy consumed to perform the tasks in the job specification, or both.

At 606, an action is performed based on the simulation results.

For example, a job specification that includes forty operations for a single industrial vehicle is received at 602. The operations may be simulated in the order that they were listed in the job specification to determine how long it would take for the industrial vehicle to perform all forty operations (along forty paths) at 604, and the results may be stored for a later comparison. Then, one of the operations may be moved to another place in the order of operation and the operations may be simulated again. The results from the second simulation may be compared to the results of the first simulation to determine which order results in the least amount of time to perform the job specification. This process can be performed multiple times to identify a desired schedule of tasks for the job specification.

To further the above example, the simulations can be repeated, first using ideal data from the data sources 116, then repeated using actual measured vehicle data ("virtual models"), e.g., as gathered by the information linking devices 302 on the industrial vehicles. This actual data can be normalized to remove the effects of the operator (to isolate just the actual vehicle), the actual operator data can be extracted out (to isolate and compare an optimal operator to an actual operator), or the actual data can be used to compare an optimal simulated result against actual performance. In this regard, the simulated paths can be extracted by using previously performed data collected by the industrial vehicles working within the environment. This data may be extracted by fusing WMS data with industrial vehicle management data, as described in greater detail herein.

As another example, instead of comparing time to complete the job specification, the simulation results may be compared for energy consumption to determine a schedule of operations with regard to energy consumed. Further, the simulation results may be compared for energy consumption and time to complete the job specification to determine a desired schedule of operations to energy consumed to balance time and energy consumed. Again, the extracted data can be ideal data or virtual data representing actual measured data from the warehouse. This allows a comparison of the efficiency of a fleet, and can provide an insight into vehicles, including battery health of actual batteries in a fleet, etc.

Another example of evaluating an industrial vehicle using the kinematic model and a workflow model for a specific type of industrial vehicle (e.g., a rider reach truck, a turret stock picker, etc.) includes receiving a job specification that includes an operation and a path as discussed above and also receiving information corresponding to an actual vehicle performing the operation in the environment from an information linking device as described above. The process performs a simulation based on time, energy, or both and compares the results to the received industrial vehicle information. If the simulation results are within a certain threshold of the received industrial vehicle information, then no further action is taken. However, if the simulation results exceed a certain threshold of the received industrial vehicle information, then the industrial vehicle information and/or models may be updated. For example, if a raise operation of a certain height is simulated to take ten seconds and the information from the actual industrial vehicle indicates that it took thirteen seconds with the hydraulics controller reporting that full speed was applied to lift the load, then the virtual industrial vehicle data used by the model for raising speed may be adjusted to correspond with the actual results (instead of the simulated results).

As a variant of the previous example, instead of modifying the data and/or model for every industrial vehicle of that type, data and a kinematic model may be stored for each industrial vehicle. Thus, the comparisons can be between a simulation of a select vehicle (e.g., turret_stock_picker_number_1) and the actual results of that select vehicle (e.g., turret_stock_picker_number_1). Then, if the comparison is outside of the threshold, the data and/or kinematic model for the select vehicle (e.g., turret_stock_picker_number_1) can be updated to correspond to the actual results that were received from the information linking device. This also allows any number of other comparisons, e.g., actual stockpicker 2 to virtual stockpicker 1, etc.

In some embodiments, operator-specific parameters are received. For example, operator-specific parameters may include whether an operator may blend two functions, has a lower maximum speed than an average operator, etc. Then, when generating the kinematic model of the industrial vehicle, the workflow model, or both, the operator-specific parameters are used to adjust the simulation results.

In several embodiments, performance-tuning parameters are received. For example, performance-tuning parameters may be vehicle-specific variables that may be encoded on the industrial vehicle (e.g., maximum speed limits (based on vehicle), limiting peak battery current draw, etc.). Then, when generating the kinematic model of the industrial vehicle, the workflow model, or both, the performance-tuning parameters are used to adjust the simulation results.

Further, a series of simulations may be run while altering performance-tuning parameters to find optimal performance-tuning parameters (based on timing, energy, or both as described above) for a specific vehicle for a job specification. Then those optimal performance-tuning parameters may be communicated to the industrial vehicle over an information linking device mounted to the vehicle to fine tune the vehicle for the job specification.

In another example configuration, a kinematic model is created for each industrial vehicle in a fleet of industrial vehicles, where the job specification includes several operations for several vehicles. The simulations in this example run by varying which operations go to which vehicles to reduce stress, battery charge, battery life, or combinations thereof across the entire fleet or for a specific vehicle of the fleet for a select shift. Also, the process may store previous simulations in memory for retrieval for later comparisons to aid in reducing the stress, battery charge, battery life, or combinations thereof.

Further, the simulations may be used to evaluate an optimal size and makeup of a fleet of industrial vehicles (e.g., seven turret stock pickers and three rider reach trucks).

As yet another illustrative example, the simulations can be used to identify what industrial vehicles in a fleet need maintenance (or determine when an industrial vehicle will be in need of maintenance).

Cutback Curves

Cutback curves indicate how much a parameter of an industrial vehicle must be modified based on a situation. By way of example, assume that the simulation is to evaluate a simple action such as starting from rest, driving forward and then stopping. Unconstrained, a drive model may, through simulation, accelerate at the industrial vehicle's defined maximum acceleration until the simulation hits the industrial vehicle maximum speed. Similarly, a deceleration is carried out as late as possible to reach the destination stopping position by decelerating at the maximum rate. This type of simulation may represent ideal capabilities of the industrial vehicle, but may not accurately reflect how the industrial vehicle actually performs when driven by an operator. As such, the disclosure herein provides cutback curves to allow the processes herein to compensate for the performance of the industrial vehicle adjusted by the operator, environment, operational constraints, vehicle, combinations thereof, etc.

Figure 7:
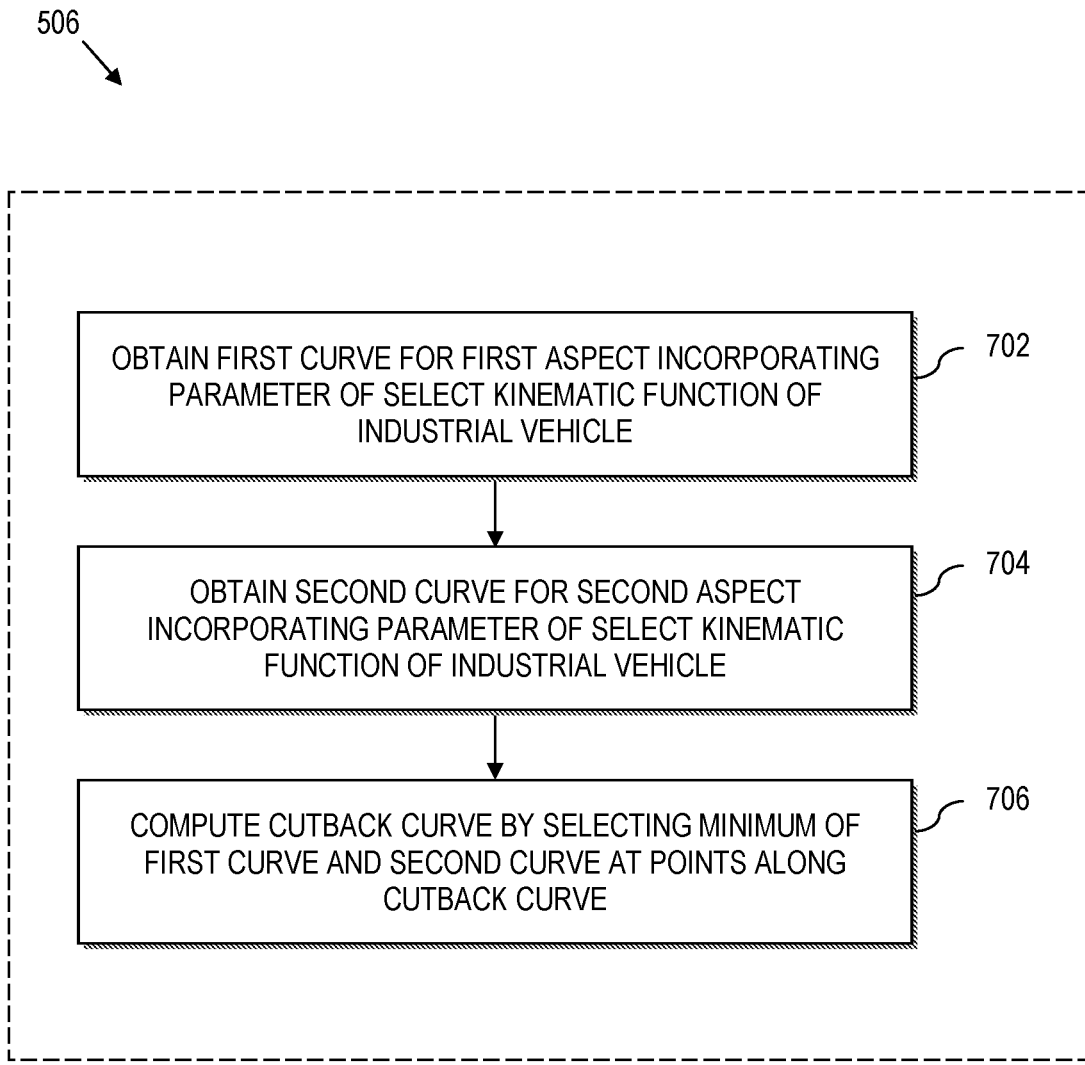
FIG. 7 is a flow chart illustrating a process to create cutback curves, according to aspects of the present disclosure.

Referring generally to FIG. 7-FIG. 10, a working example illustrates a particular way of computing a cutback curve. FIG. 7 is an example approach to implement the process 506 (of FIG. 5) for computing cutback curves. At 702, a first curve for a first aspect incorporating a parameter of a select kinematic function of a vehicle is obtained. For example, FIG. 8 illustrates a curve for speed based on fork height during braking (i.e., deceleration) of the industrial vehicle.

Referring back to FIG. 7, at 704, a second curve for a second aspect incorporating the parameter of the select kinematic function of the vehicle is obtained. For example, FIG. 9 illustrates a curve for speed based on fork height during normal performance of the industrial vehicle. The illustrated cutback curve may itself, be a composite curve defined by interpolating between an empty performance curve and a performance curve for a load.

Referring back to FIG. 7, at 706, a combined cutback curve is computed by selecting a minimum of the first curve (FIG. 8) and the second curve (FIG. 9) at points along a common coordinate axis of the first and second cutback curves.

For example, FIG. 10 illustrates computing the combined cutback curve based on the curve during braking of FIG. 8 and the curve for normal performance of FIG. 9, also limiting the cutback curve based on a maximum speed of the warehouse (i.e., an environmental constraint). From fork height A to fork height B, the maximum speed is the maximum warehouse speed (despite the vehicle having a greater speed capability). From fork height B to fork height C, the maximum speed is the normal performance curve of FIG. 9. Finally, from fork height C to fork height D, the maximum speed is the braking curve of FIG. 8. Thus, the cutback curve for speed versus fork height is the resulting curve from A to D as shown as the solid line in FIG. 10.

Execute Simulation Based Upon Job Specification

Figure 11:
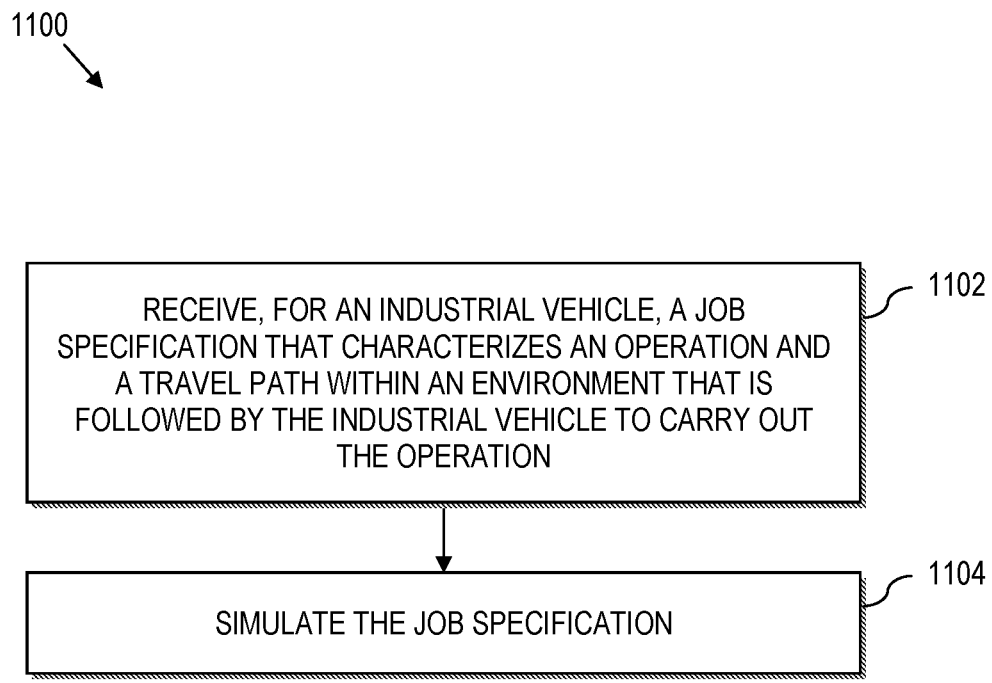
FIG. 11 is a flow chart illustrating a process for evaluating industrial performance, according to aspects of the present disclosure.

FIG. 11 illustrates a process 1100 for evaluating an industrial vehicle. The computer-executed processes of FIG. 11 can be executed by a hardware processor coupled to physical memory, where the processor is programmed by program code stored in the memory, to perform the processes herein. By way of example, the process of FIG. 11 can be executed by one or more instances of the analysis engine 114 on a corresponding processing device 102 using data sources 116 as set out in greater detail herein. In particular, the process 1100 can be carried out by the system of FIG. 4, including the processing engine 416. The process can be carried out on one physical computing device, or the process can be distributed across multiple physical computing devices, e.g., in a client-server manner. The computer-executed process of FIG. 11 can also be implemented on computer-readable hardware that stores machine-executable program code, where the program code instructs a processor to implement the described computer-executed processes.

At 1102, a job specification is received. The job specification characterizes an operation and a travel path within an environment that is followed by the industrial vehicle to carry out the operation. The job specification may be similar to the job specifications as described above, in particular, with reference to FIG. 4.

At 1104, a processing engine simulates the job specification.

Figure 12:
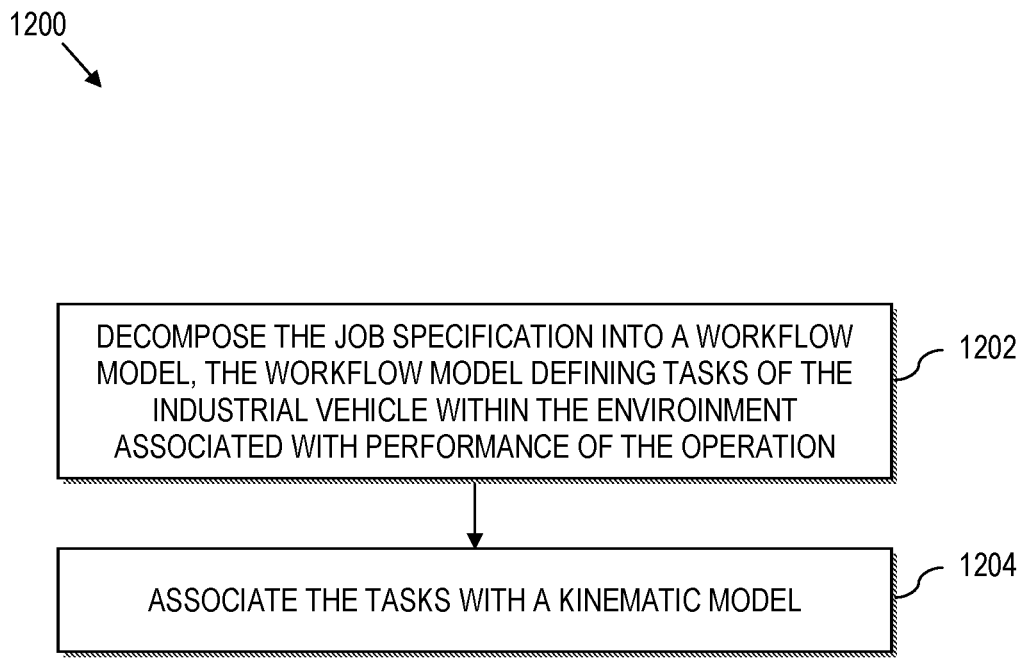
FIG. 12 is a flow chart illustrating a process for simulating a job specification, according to aspects of the present disclosure.

With reference to FIG. 12, an example of simulating the job specification is described. At 1202, the job specification is decomposed into a workflow model defining tasks of the industrial vehicle within the environment associated with performance of the operation. At 1204, the tasks are associated with a kinematic model.

Figure 13:
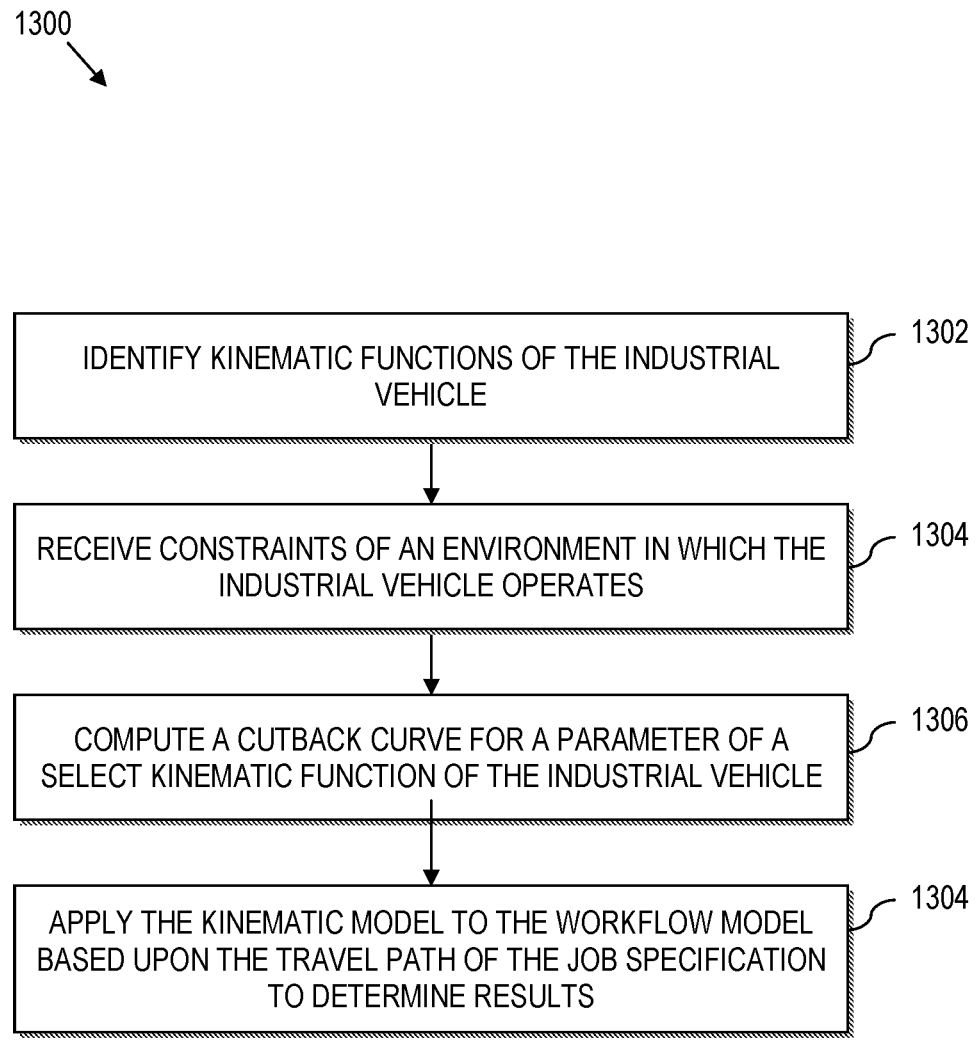
FIG. 13 is a flow chart illustrating a process for associating tasks with a kinematic model, according to aspects of the present disclosure.

Referring to FIG. 13, an example of using a kinematic model is described. In FIG. 13, at 1302, kinematic functions (e.g., those functions required by the tasks of the workflow) are identified. At 1304, constraints of an environment in which the industrial vehicle operates are received. At 1306, a cutback curve for a parameter of a select kinematic function of the industrial vehicle is computed or otherwise obtained. For example, the cutback curve may be computed in a process similar to the process 516 of FIG. 7. Then, at 1308, the kinematic model is applied to the workflow model based on the travel path of the job specification to simulate results.

Working Example

Figure 14:
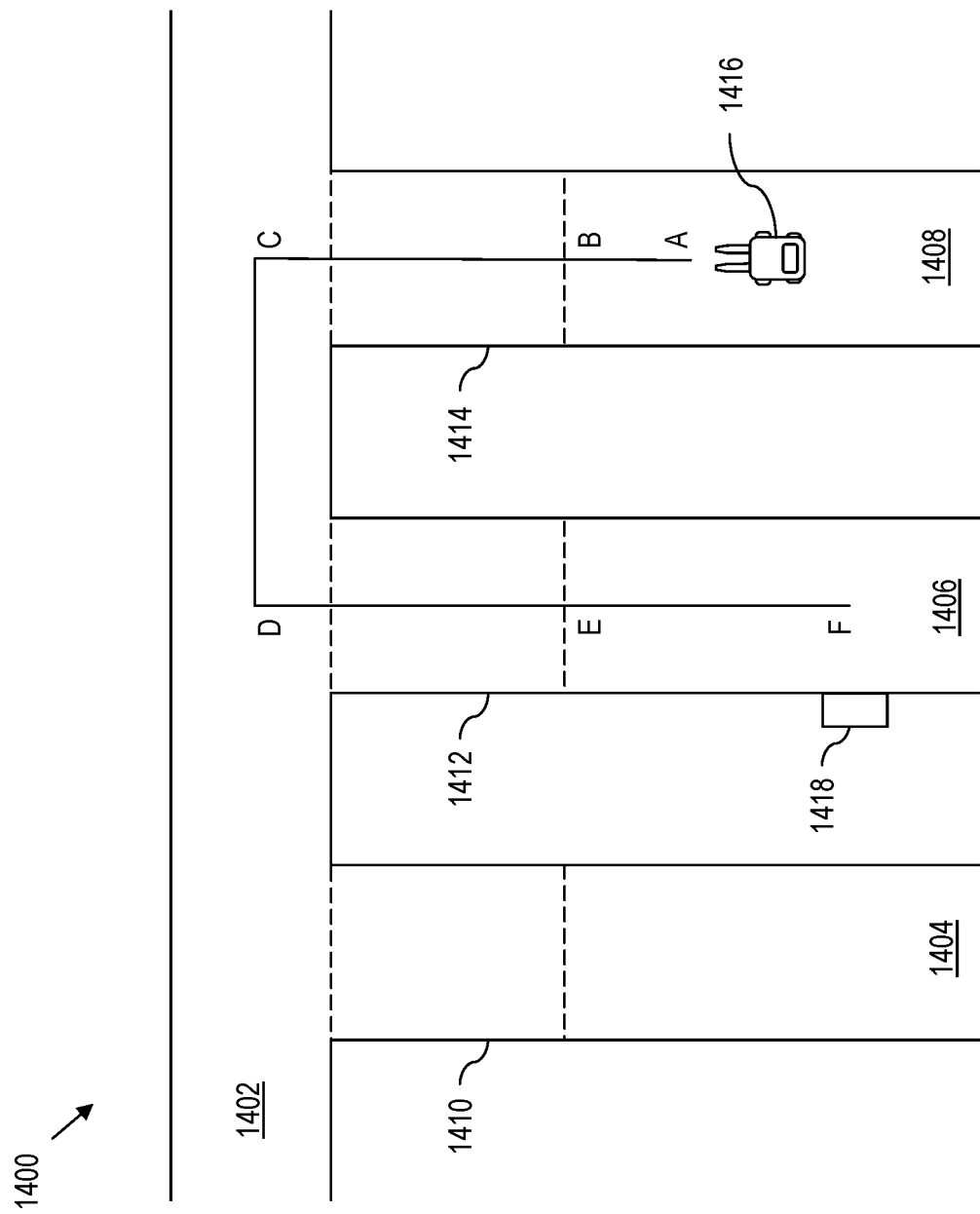
FIG. 14 is a map illustrating an example route that an industrial vehicle may take during a job of a workflow in an example warehouse layout, according to various aspects of the present disclosure.

FIG. 14 illustrates a non-limiting, working example of applying the kinematic model to the workflow model. Specifically, FIG. 14 illustrates a warehouse layout 1400 with a main lane 1402 and three aisles 1404, 1406, 1408 off of the main lane 1402. The aisles 1404, 1406, 1408 each include an end-of-aisle zone 1410, 1412, 1414 where the aisles 1404, 1406, 1408 abut the main lane 1402. In various embodiments, this layout is stored in the environmental model (212, FIG. 2).

In this simulation, an industrial vehicle 1416 has just finished a putaway operation and must now perform a retrieval operation, as specified in a job. A workflow model created in one of the methods described above indicates that a retrieval includes:

Retrieval
1. Start at an Outbound Slot
2. Drive and Raise to a Rack Slot
3. Pivot, if necessary
4. Traverse In
5. Slot Interaction Retrieval Pallet Pick
6. Gain Load The job also indicates a route ABCDEF for the industrial vehicle to take to get from the outbound slot (i.e., start point) A to the desired rack slot (i.e., end point) F. Thus, during the simulation, the kinematic model is applied to the workflow model to predict/verify time spent, energy spent, or both. For this example, a blending operation is not allowed.

In the simulation, the retrieval starts (step 1 above) at an outbound slot of aisle 1408 at point A. The next step (i.e., step 2) of a retrieval operation in this example includes driving along the route. When the simulated industrial vehicle 1416 drives along the route from point A to point B, the distance between A and B is determined, and the kinematic model is used to determine an acceleration rate value and a maximum speed value that the simulated industrial vehicle 1416 may achieve during that portion of the route. From those values, the processing engine (416, FIG. 4) may calculate a time and/or energy spent during that portion AB of the route, based on further values (e.g., energy consumed based on acceleration, energy consumed based on a certain speed, etc.) from the kinematic model and vehicle data stored in the data sources 116, 404, etc.

The next portion BC of the route includes the simulated industrial vehicle 1416 driving from point B through the end-of-aisle zone 1414 to the main lane 1402, point C. Again, a distance is determined. Moreover, while in the end-of-aisle zone 1414, a cutback curve associated with the end-of-aisle zone 1414 will limit the maximum speed value of the simulated industrial vehicle 1416, which is obtained from the kinematic model. Thus, the processing engine may calculate a time and/or energy spent during that portion BC of the route, based on further values from the kinematic model.

The third portion CD of the route includes the simulated industrial vehicle 1416 driving from point C to point D along the main lane 1402. Again, a distance is determined. Moreover, values for acceleration and maximum speed are obtained from the kinematic model to determine time and/or energy as discussed above. In the fourth portion DE of the route, distance is determined and the simulated industrial vehicle 1416 drives through the end-of-aisle zone 1412 of aisle 1406. The kinematic model again supplies time and/or energy values for this portion DE of the route based on maximum acceleration and speed. In some embodiments, the end-of-aisle zones 1412, 1414 have identical cutback curves, but in other embodiments, the end-of-aisle zones 1412, 1414 have different cutback curves. Further, in several embodiments, the cutback curve for an end-of-aisle zone is not used if the direction of the industrial vehicle is away from the end of the aisle (instead of toward the end of the aisle). This information is reflected in the kinematic model.

The last portion of the route EF includes driving from the end of the end-of-aisle zone (point E) to the rack slot 1418 (point F). Again, the kinematic model supplies time and/or energy values for this portion DE of the route based on maximum acceleration, speed and distance. Thus, step 2 is complete and time and/or energy for step 2 is obtained.

Step 3 of the retrieval operation includes pivoting forks of the simulated industrial vehicle 1416 to face the rack slot 1418, and time and/or energy for the pivot are obtained from the kinematic model. Step 4 of the retrieval operation includes traversing in (i.e., extending the forks) to engage a pallet in the rack slot 1418. As with the other steps herein, the kinematic model includes time and/or energy associated with a traverse in. Further, steps 5 and 6 of the retrieval operation include a slot interaction and a load gain. Again, the kinematic model includes time and/or energy associated with a slot interaction and a load gain.

The total time and energy consumed for the six steps of the retrieval operation may be calculated by aggregating the individual time and energy, respectively, of each of the steps. Note, that a further operation with the simulated industrial vehicle 1416 at this point may also include the load (e.g., limits on speed and/or acceleration as specified in cutback curves can be (further) based on load, energy spent may increase as load weight increases, driving with forks raised, etc.).

Even though the example simulation above illustrates the steps (and portions of the route) being performed in sequential order and a real vehicle will perform the steps in that sequential order, the simulation may be performed in any order, in parallel, or combinations thereof (e.g., steps 1, 3, and 4 concurrently, then steps 2 and 5-6 concurrently). Further, the example given is for a single operation of a single workflow for a single industrial vehicle, but other simulations may be for multiple vehicles and/or multiple operations. Moreover, the operations of the job may include more or fewer steps.

Fleet Size Estimation

A fleet estimator tool 1500 includes a graphical user interface to prompt a user to input 1502 a number of variables. For example, a user may input variables concerning a warehouse configuration. Typically, a warehouse will comprise warehouse aisles that are characterized by respective aisle lengths, bay heights, storage levels, etc. These, and other, characteristics of the warehouse may be displayed on the graphical user interface of fleet estimator tools configured to operate according to the concepts of the present disclosure.

Further, the user interface can be configured to prompt a user to designate whether a vehicle will be operating in an autonomous or semi-autonomous mode, or with some other type of autonomous operational feature variable. In a broad sense, the autonomous operational feature variable represents the use or non-use of one or more autonomous operational features by the materials handling vehicles. More particularly, a variety of autonomous operational features are contemplated by the present disclosure including, for example, automatic speed, steering, and/or lift height control as the vehicle progresses down an aisle toward a target bay. For example, the user is prompted to designate whether vehicles to be configured for operation in the warehouse will be operating with an "AutoPositioning" feature, which is a generic name for any type of feature that allows the vehicle to be driven autonomously, or semi-autonomously, to a specific bay of the aisle, along a specific path, with specific speed, steering, and/or lift height controls. The graphical user interface can also be configured to prompt a user to select particular performance settings as an autonomous operational feature variable. For example, a user may designate whether the vehicle is provided with "End-of-Aisle" control restrictions or "Speed Limit" restrictions. Under End-of-Aisle control, particular speed restrictions may be placed on vehicle operation as the vehicle approaches and/or leaves the end of an aisle. Speed Limit restrictions may be applicable to travel anywhere in the aisle, or outside the aisle.

It is contemplated that the autonomous operational feature variable may represent any feature that provides some sort of automatic control of the speed, direction, and/or lift height of the materials handling vehicle. In this manner, fleet estimator tools 1500 according to the present disclosure may be configured to provide users with a convenient way to compare fleet size calculations with and without particular autonomous operational features. More specifically, a user of the tool described herein may compare respective fleet size estimates for two different materials handling vehicles—one with minimal automation, and the other with one or more particular automation features, like the aforementioned "AutoPositioning," "End-of-Aisle," or "Speed Limit" features. Thus, a user may set up a warehouse model 1506 (discussed in greater detail above) for estimating a fleet size for a particular warehouse.

Further, the graphical user interface may be additionally configured to prompt a user to provide inputs representing various operational cost variables associated with a particular fleet configuration (e.g., "Operation Hours per Shift," "No. of Shifts per Day," "Energy Cost per kWh," "Operator Hourly Rate," etc.), and that a fleet estimator engine may be configured to generate outputs representing fleet operational costs based, at least in part, on the cost variables input for the particular fleet configuration. For example, and not by way of limitation, it may be preferable to generate an output indicating cost per load move for a particular operational model. In this manner, the fleet estimator tool 1500 permits a user to compare energy and labor costs corresponding to different operational models, including those distinguished by the use, or non-use, of particular automation features, like the aforementioned "AutoPositioning," "End-of-Aisle," or "Speed Limit" features.

Further, the user may be prompted for other vehicle configuration variables via the graphical user interface. However, it is noted that a variety of conventional and yet-to-be developed vehicle configuration variables are contemplated by the present disclosure including, but not limited to, variables representing the drive mechanisms and their operating characteristics, the materials handling mechanisms and their operating characteristics, and the software or hardware based vehicle control architecture of the materials handling vehicles. It is also contemplated that additional simulation variables may be prompted for input at the graphical user interface including, but not limited to variables representing the configuration and characteristics of the warehouse in which the vehicles are to operate.

In operation, a first logic portion 1504 fleet size estimator engine 1500 can be configured to create instances of a Warehouse Model 1506, an Operations Model 1508, Vehicle Specifications 1510, and Workflow Parameters 1512. The first logic portion 1504 fleet size estimator engine 1500 can be configured to create these instances using the autonomous operational feature variable, the vehicle configuration variables, and the additional simulation variables input at the graphical user interface, as represented in the Kinematics & Energy Data 1516 and Configuration Data 1514.

The aforementioned Workflow Parameters 1512 can be derived from workflow data in the Configuration Data 1514 and Kinematics Data 1516 of the configuration model. For example (as discussed above), it may be preferable to establish workflow models representing putaway and retrieval operations for particular vehicle and warehouse configurations. A suitable putaway model may represent time, speed, and/or energy data for a vehicle progression from initialization at a rack slot, driving and raising to an inbound slot, pivoting if necessary, traversing into the slot, slot interaction for a putaway pallet pick, gaining a load, traversing out of the slot, driving and raising back to the rack slot, pivoting if necessary, traverse into the slot, slot interaction for a putaway pallet place, losing the load, and traversing out of the slot. A suitable retrieval model may represent time, speed, and/or energy data for vehicle progression from initialization at an outbound slot, driving and raising to a rack slot, pivoting if necessary, traversing into a slot, interacting with the slot for a retrieval pallet pick, gaining a load, traversing out of the slot, driving and raising back to the outbound slot, pivoting if necessary, traversing into a slot, interacting with the slot for a retrieval pallet place, losing the load, and traversing out of the slot.

It is contemplated that it may be advantageous in many embodiments to provide for user input of a slot interaction time. More specifically, the graphical user interface may be configured to prompt a user to input a slot interaction time, which can be used in the generation of the fleet size estimate. The slot interaction time may represent both putaway and retrieval operations, or the user may be prompted to input separate slot interaction times for putaway and retrieval operations. The slot interaction time is typically specific to the warehouse in which the associated materials handling vehicle is operating, and may alternatively, or additionally, be specific to the particular operation to be executed at the associated slot, i.e., putaway, retrieval, pick, place, etc. The slot interaction time is typically not specific to the particular materials handling vehicle designated for operation in a particular site.

Further, the fleet size estimator engine 1500 may also comprise a second logic portion 1518 that generates the fleet size estimate as a function of a fleet Workflow Model 1520 and a Kinematics and Energy Model 1522 of the materials handling vehicles. Generally, a workflow represents a cyclical set of tasks that can be performed by a vehicle, with or without an operator. Typically, a workflow will end at the same state it started. Tasks within a workflow may include drive and raise tasks, pivot tasks, load handler traverse tasks, slot interaction tasks, and load change tasks (described in greater detail above). A vehicle's kinematics and energy model may be presented as a simplified kinematic model constructed from a vehicle's specifications and typically contains the motion and energy consumption data of the different functions of the truck including, for example, drive characteristics, raise characteristics, pivot characteristics, and load handler traverse characteristics.

According to aspects of the present disclosure, there will be several main calculations to be performed involving the average time and energy consumption per workflow including: average per racking slot, average per task, and overall average. The tasks within a workflow can be calculated independently as (i) the average slot interaction time, which is typically constant and consumes no energy; (ii) the average traverse in/out times and energy, which are also typically constant; (iii) the average pivot time and energy, which is a proportion of time and energy for one pivot based on how likely that task came from a slot that is on the opposite side of the next slot; and (iv) the average drive time, which is calculated as the sum of all combinations of drives between all of the "From" slots and "To" slots and can be proportioned by the chance of those slots being used, as described in greater detail above.

The second logic portion 1518 fleet size estimator engine 1500 can be configured to generate the fleet Workflow Model 1520 and the Kinematics and Energy Model 1522 from the autonomous operational feature variable, vehicle configuration variables and the additional simulation variables input at the graphical user interface. Further, the fleet size estimator engine 1500 can also be configured to generate the fleet Workflow Model 1520 and the Kinematics and Energy Model 1522 from the Configuration Data 1514 and the Kinematics and Energy Data 1516 of the configuration model. The Configuration Data 1514 can represent the configuration characteristics of the materials handling vehicles, the warehouse, or both.

The fleet size estimator engine 1516 generates the fleet Workflow Model 1520 and the Kinematics and Energy Model 1522 by combining the Warehouse Model 1506, the Operations Model 1508, the Vehicle Specifications 1510, and the Workflow Parameters 1512 with the Configuration Data 1514 and the Kinematics and Energy Data 1516. Subsequently, the fleet size estimator engine 1518 utilizes the fleet Workflow Model and the Kinematics and Energy model to generate the Fleet Size Estimate 1516 at the ambulatory computing device.

Figure 15:
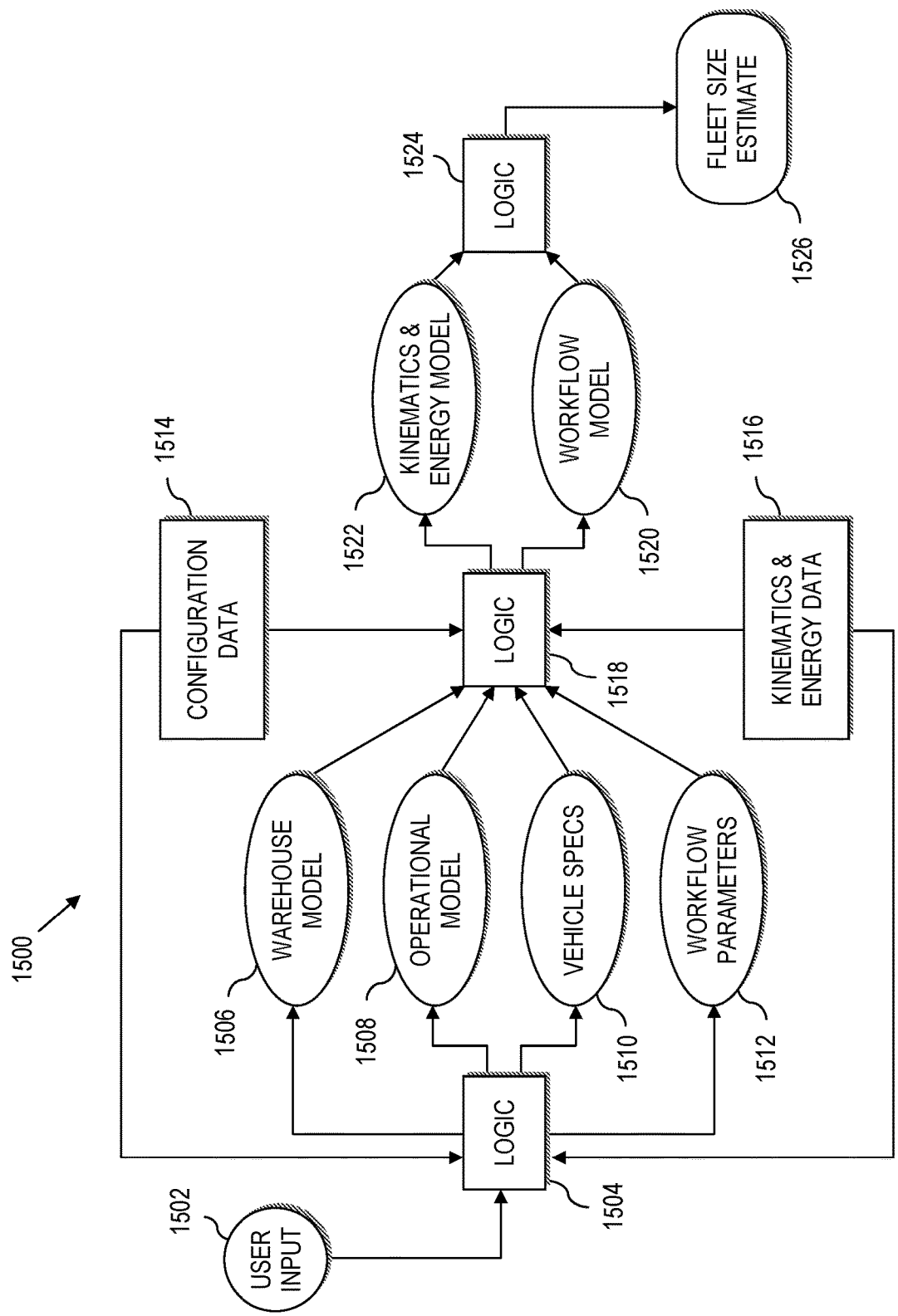
FIG. 15 is a block diagram illustrating a fleet size estimation tool, according to various aspects of the present disclosure.

In operation, a third login portion 1524 fleet size estimator engine 1500 utilizes the Configuration Data 1514 to generate a fleet size estimate at an ambulatory computing device (tablet, smartphone, laptop, etc.). As illustrated in FIG. 15, the first logic portion 1604, the second logic portion 1518, and the third logic portion 1524 are discrete logic portions. However, two or all three logic portions of the fleet estimator tool 150 may be the same discrete logic, performed by a same processor, or combinations thereof.

The Configuration Data 1514 represents the configuration characteristics of the materials handling vehicles, the warehouse, or both, and may be selected to complement the above-described vehicle configuration and additional simulation variables. The Fleet Size Estimate 1516 is a function of the vehicle configuration variables and the additional simulation variables that are input at the graphical user interface. As is described in further detail below, the Fleet Size Estimate 1516 may also be generated as a function of the autonomous operational feature variable, e.g., the AutoPositioning variable described above.

More specifically, the architecture of the fleet estimator tool 1500 is configured such that the graphical user interface, fleet size estimator engine 1516, and configuration model 1514 form a modular Model View Controller architecture with a passive model and stateless controller. The Model View Controller architecture is well suited for implementing user interfaces and conveniently separates responsibility into the three modular parts of the tool, with abstract interfaces between them allowing for a part to be substituted for another with different behavior without changing the other parts. For example, the architecture permits the modular use of user interfaces on different platforms, the interchangeability of database and XML, etc. As users of the fleet estimator tool 1500 will merely be selecting a configuration and will not necessarily be creating any new data the model can be passive and immutable. In addition, to simplify interaction and responsibility, all of the interfaces can be stateless.

For example, and not by way of limitation, in one implementation of the concepts of the present disclosure, the fleet size estimator engine 1500 extracts values representing daily vehicle workflow time $t_W$, daily vehicle recharging time $t_R$, daily vehicle aisle change time $t_C$, shift operation time $t_S$, and daily number of shifts S from the fleet Workflow Model and the Kinematics and Energy model to calculate the Fleet Size Estimate N in approximate accordance with $$N = \frac{t_W + t_R + t_C}{t_S \times S}$$

or a mathematical equivalent thereof.

The daily vehicle workflow time $t_W$ can be calculated according to $$t_W = (t_{AP} \times P_{IN}) + (t_{AR} \times P_{OUT})$$

where $t_{AP}$ represents average putaway time, $P_{IN}$ is a user input that represents the number of pallets in per day, $t_{AR}$ represents average retrieval time, and $P_{OUT}$ is a user input that represents the number of pallets out per day. The average putaway and retrieval times $t_{AP}$ and $t_{AR}$ can be represented as $$t_{AP} = \sum_{t \in Tasks} \left( \sum_{r \in RackSlots} (CalcData(Putaway, t, r) \cdot time \times ProductVelocity(r)) \right)$$

and $$t_{AR} = \sum_{t \in Tasks} \left( \sum_{r \in RackSlots} (CalcData(Retrieval, t, r) \cdot time \times ProductVelocity(r)) \right)$$

where t is the task and r is the racking slot.

The daily vehicle recharging time $t_R$ can be calculated according to $$t_R = (t_{BA} \times R)$$

where $t_{BA}$ represents the battery change time and R represents the number of recharges per day, which can be calculated according to $$R = \frac{V_\Delta}{V_T(0.8) \times B}$$

where $V_\Delta$ represents the charge drain per day, $V_T$ represents available battery capacity, and B represents the vehicle's battery capacity, i.e., the number of batteries per vehicle. The charge drain per day $V_\Delta$ can be calculated according to $$V_\Delta = (V_{\Delta P} \times P_{IN}) + (V_{\Delta R} \times P_{OUT})$$

where $V_{\Delta P}$ represents the average putaway charge drain, $V_{\Delta R}$ represents the average retrieval charge drain, $P_{IN}$ represents the number of pallets in per day, and $P_{OUT}$ represents the number of pallets out per day. The average putaway and retrieval charge drains $V_{\Delta P}$ and $V_{\Delta R}$ can be represented as $$V_{\Delta P} = \sum_{t \in Tasks} \left( \sum_{r \in RackSlots} (CalcData(Putaway, t, r) \cdot chargeDrain \times ProductVelocity(r)) \right)$$

and $$V_{\Delta R} = \sum_{t \in Tasks} \left( \sum_{r \in RackSlots} (CalcData(Retrieval, t, r) \cdot chargeDrain \times ProductVelocity(r)) \right)$$

The daily vehicle aisle change time $t_C$ can be calculated according to $$t_C = \left( \frac{P_{IN} + P_{OUT}}{W_A} \right) \times t_{C'}$$

where $P_{IN}$ represents the number of pallets in per day, and $P_{OUT}$ represents the number of pallets out per day, $W_A$ is a user input that represents the number of workflows per aisle change, and $t_{C'}$ represents singular aisle change time, which can be calculated according to $$t_{C'} = \left( \frac{d}{s} \right)$$

where d is a user input that represents the distance between aisle centers and s represents the aisle change speed.

It is contemplated that the fleet size estimator engine 1500 may utilize the autonomous operational feature variable to instruct generation of the Fleet Size Estimate 1526 in a variety of ways to reflect an increase or decrease in the number of vehicles N. For example, where the autonomous operational feature comprises an operational mode where a lift truck or other type of materials handling vehicle autonomously positions itself to access a warehouse storage bay, it is contemplated that the automated operation will result in increased operational efficiency and therefore reduce the Fleet Size Estimate N. In other cases, it is contemplated that the autonomous operational feature will comprise an operational mode where a lift truck or other type of materials handling vehicle is operated in a less efficient manner, resulting in an increase in the Fleet Size Estimate. In any case, it is contemplated that the autonomous positioning may include (i) autonomous control of vehicle control architecture for the drive and materials handling mechanisms of the materials handling vehicles, (ii) autonomous selection of a travel path to a warehouse storage bay, or (iii) both. It is also contemplated that the autonomous operational feature may comprise an operational mode where the traveling speed and/or materials handling mechanism of a materials handling vehicle is controlled autonomously.

When the graphical user interface is set up for selection of AutoPositioning or some other type of autonomous operation feature mode, the fleet size estimator engine 1500 is configured to service a query regarding the use or non-use of the autonomous operational feature from the graphical user interface, in addition to queries regarding warehouse configuration, vehicle operation, and vehicle configuration. The fleet estimator engine 1500 can then be configured to utilize its Logic 1524 to extract values representing daily vehicle workflow time $t_W$, daily vehicle recharging time $t_R$, daily vehicle aisle change time $t_C$, shift operation time $t_S$, daily number of shifts S, and combinations thereof, from the serviced queries and the Configuration Data of the configuration model 40. Typically, one or more of the extracted values $t_W$, $t_R$, $t_C$, and $t_S$ will be functionally dependent upon the query result for the use or non-use of the autonomous operational feature. For example, if AutoPositioning is enabled, the daily vehicle workflow time $t_W$ and the daily vehicle aisle change time $t_C$ will both decrease if AutoPositioning increases operating efficiency, in which case the Fleet Size Estimate will also decrease.

Although the particular mathematical relationship connecting the use or non-use of a particular autonomous operational feature mode with a particular fleet size estimate may vary according to the particular preferences of those practicing the concepts of the present disclosure, it is noted that the functional dependency of the extracted values $t_W$, $t_R$, $t_C$, and $t_S$ may be such that the fleet size estimate N is generated in approximate accordance with $$N = \frac{\alpha_1 t_W + \alpha_2 t_R + \alpha_3 t_C}{\alpha_4 t_S \times S}$$

or a mathematical equivalent thereof, where $\alpha_1$, $\alpha_2$, $\alpha_3$, and $\alpha_4$ represent a degree to which the use or non-use of the autonomous operational feature imparts a measurable variation to the extracted values. It is further contemplated that some of the extracted values exhibited in the aforementioned relation may be equal to 1, representing a condition where the use or non-use of the autonomous operational feature does not impart a measurable variation to the extracted value.

Figure 16A:
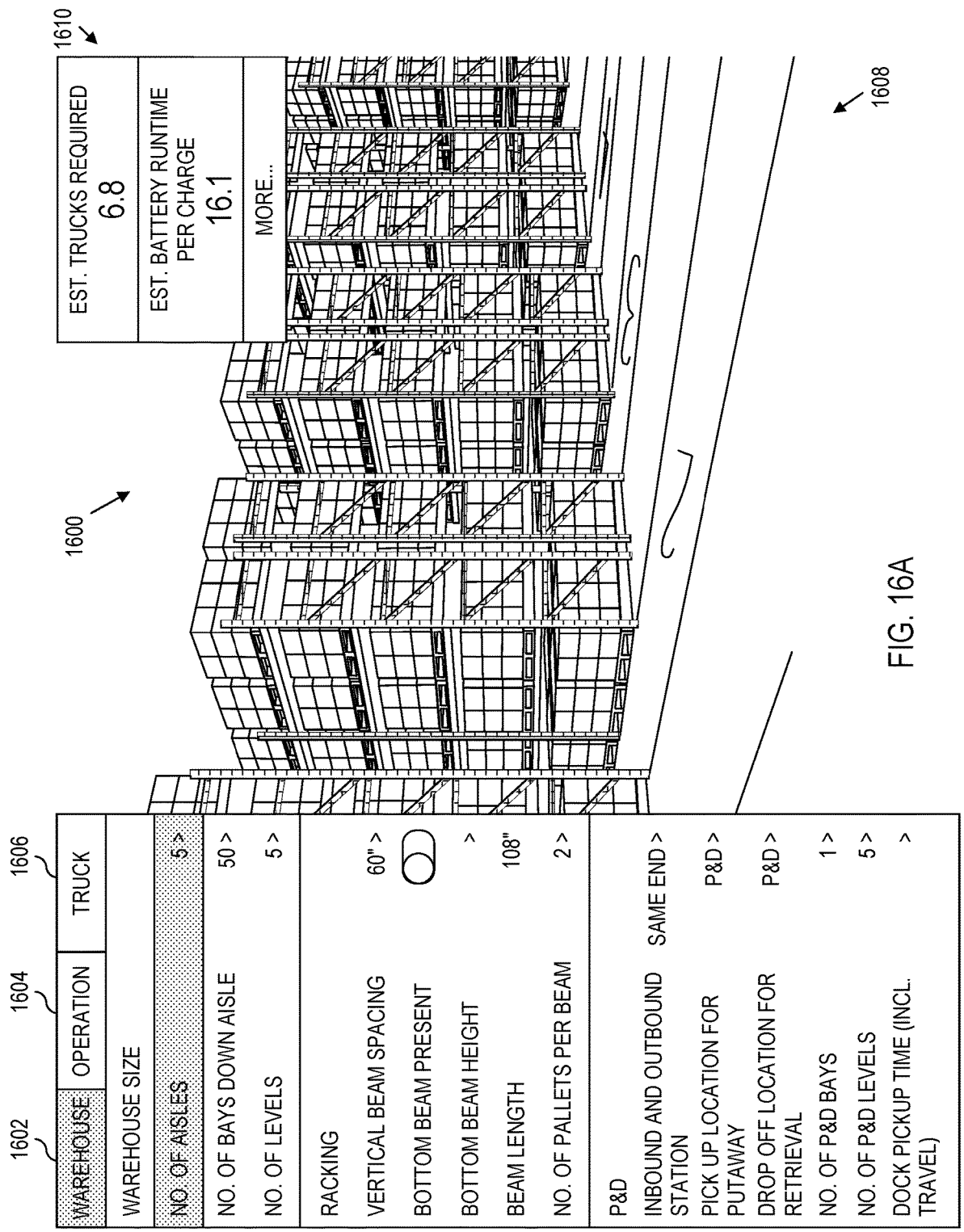
FIGS. 16A-C are illustrations showing example graphical user interfaces for the fleet size estimation tool, according to various aspects of the present disclosure.
Figure 16B:
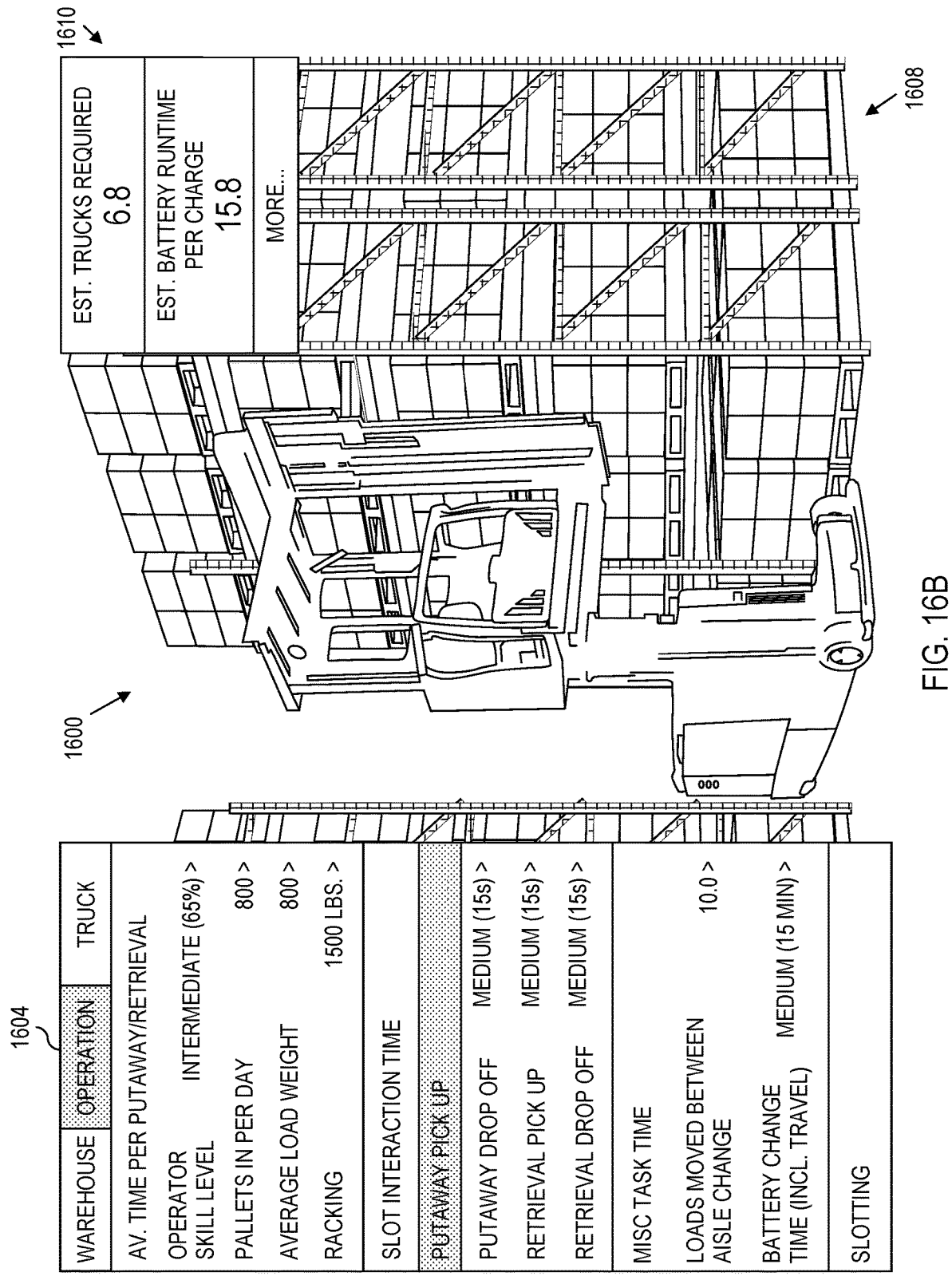
Figure 16C:
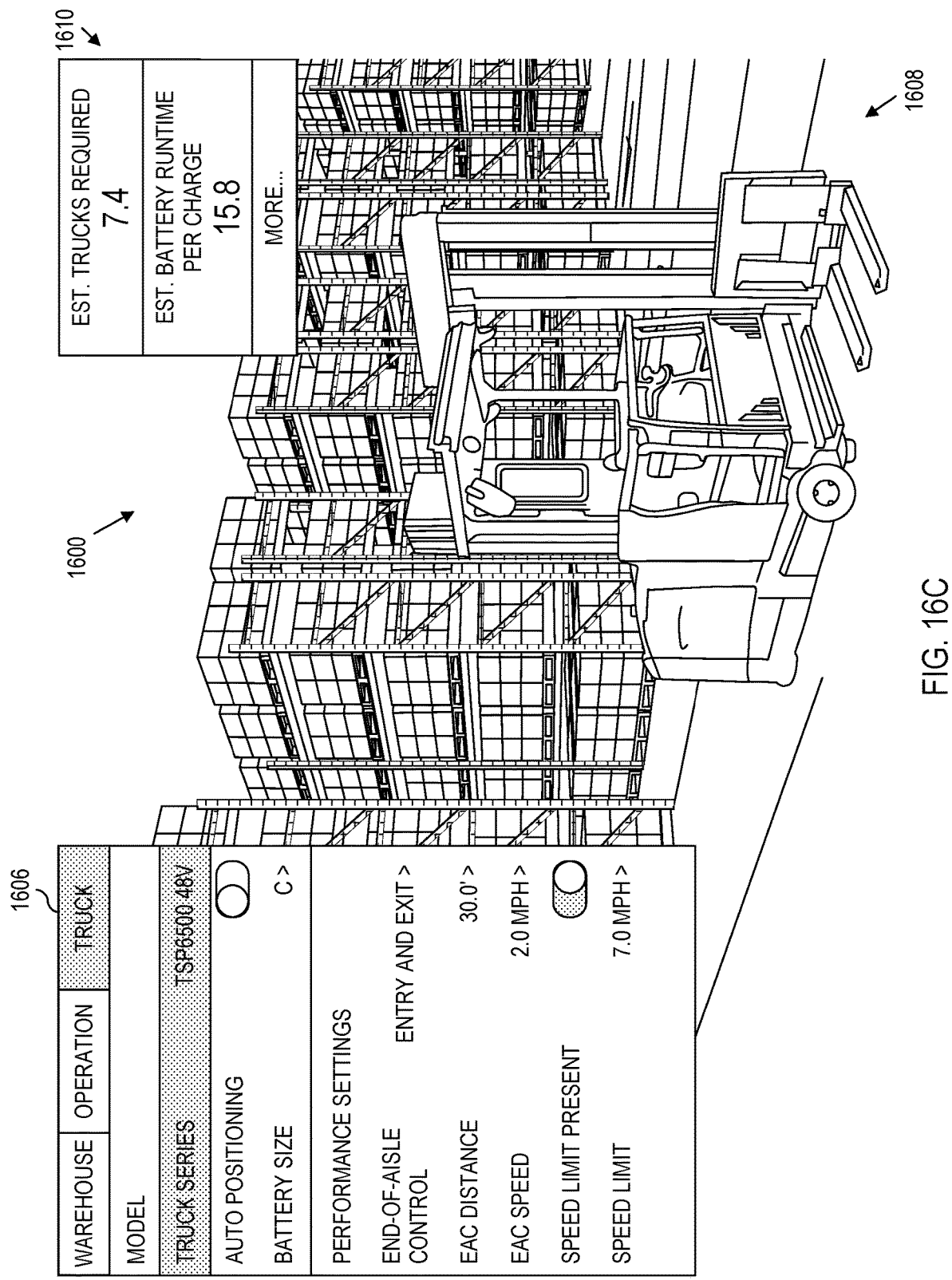

Turning to FIGS. 16A-C, and in particular to FIG. 16A, an example graphical user interface (GUI) 1600 for entering inputs into the fleet estimator tool is shown. The top left of the GUI 1600 includes three tabs that indicate warehouse 1602, operation 1604, and truck 1606 to allow a user to enter inputs to the warehouse model (1506, FIG. 15), the operational model (1508, FIG. 15), and the vehicle specification (1510, FIG. 15), respectively. As shown in FIG. 16A, the warehouse tab 1602 is selected; thus, there are parameters for the warehouse shown. For example, the user may input a number of aisles, a number of down bays, a number of levels, etc. Further, the user may enter inputs concerning racking in the warehouse (e.g., vertical beam spacing, whether a bottom beam is present, a beam length, a number of pallets per beam, etc.). Moreover, parameters for pick up and drop off are shown. As the user enters inputs, a graphical representation 1608 of the warehouse is shown to the left.

FIG. 16B illustrates the GUI 1600 when the operation tab 1604 is selected. For example, the user may enter inputs for average time for putaway or retrieval, slot interaction time, miscellaneous task time, slotting, operations (e.g., energy and monetary costs), etc. Note that the left portion 1608 of the GUI 1600 may change to illustrate changes in operation values.

Further, the graphical user interface 1600 with the operation tab 1604 selected may additionally be configured to prompt a user to input a prime user efficacy variable representing a skill level of operators associated with the materials handling vehicles. This prime user efficacy variable is represented in the "Operator Skill Level" field, as "Intermediate (65%)." FIG. 8 shows a set of three available prime user efficacy variables; namely, "Beginner (55%)," "Intermediate (65%)," and "Expert (75%)," representing the degree to which a particular vehicle operator can be expected to operate a vehicle according to its optimum operational parameters. It is, of course, contemplated that these variables can assume a variety of absolute values for use by the fleet size estimator engine.

In this manner, the fleet size estimator engine can be configured to generate the Fleet Size Estimate (1526, FIG. 15) as a further function of the prime user efficacy variable. More specifically, the particular skill level of the individuals targeted for using the vehicles of a fleet will primarily impact the Operational Model and Workflow Parameters that are utilized to generate the Fleet Size Estimate. The effectiveness with which particular users of a fleet of vehicle operate within these operational and workflow constraints will result in a corresponding increase or decrease in the Fleet Size Estimate.

For example, a variety of variables can affect the operational and workflow characteristics associated with operation of a particular materials handling vehicle in a particular warehouse. These characteristics may include (i) the number of pallets handled per day and the average load weight of the pallets, (ii) slot interaction times, (iii) miscellaneous task times, (iv) slot usage parameters, and (vi) operating parameters, such as operational hours per shift and number of shifts per day.

The fleet size estimator engine 1600 may also use the aforementioned slot usage parameters to inform the Fleet Size Estimate. Specifically, the graphical user interface can be configured to prompt a user to input an aisle usage parameter indicating the relative degree to which the materials handling vehicles access storage bays located in different slot zones of an aisle. For example, slots (also referred to herein as storage bays) are given two different inbound/outbound loading station configurations (e.g., Fastest Slots, Slowest Slots, Medium Slots, etc.).

The graphical user interface can be configured to prompt a user to input an aisle change parameter indicating a number of loads to be moved in an aisle before an aisle change is to be executed. For example, a value of 1.0 for the number of loads to be moved before an aisle change is executed may yield one fleet size estimate. In contrast, a value of 3.0 for the number of loads to be moved before an aisle change is executed may yield a lower fleet size estimate, which represents increased efficiency associated with moving multiple loads before an aisle change is executed.

FIG. 16C illustrates the GUI 1600 with the truck tab 1606 selected so the user may input parameters for vehicle specifications. For example, the parameters may include a truck series, whether AutoPositioning is used, battery size, end-of-aisle control (EAC), EAC distance, EAC speed, speed limit, etc. As with the other tabs, the left portion 1608 of the GUI 1600 changes depending on the values input for the parameters.

Further, in any of the tabs 1602, 1604, 1606, a window 1610 illustrating a fleet size estimate and an estimated battery runtime per charge is updates depending on the values of the parameters.

Computer System Overview

Figure 17:
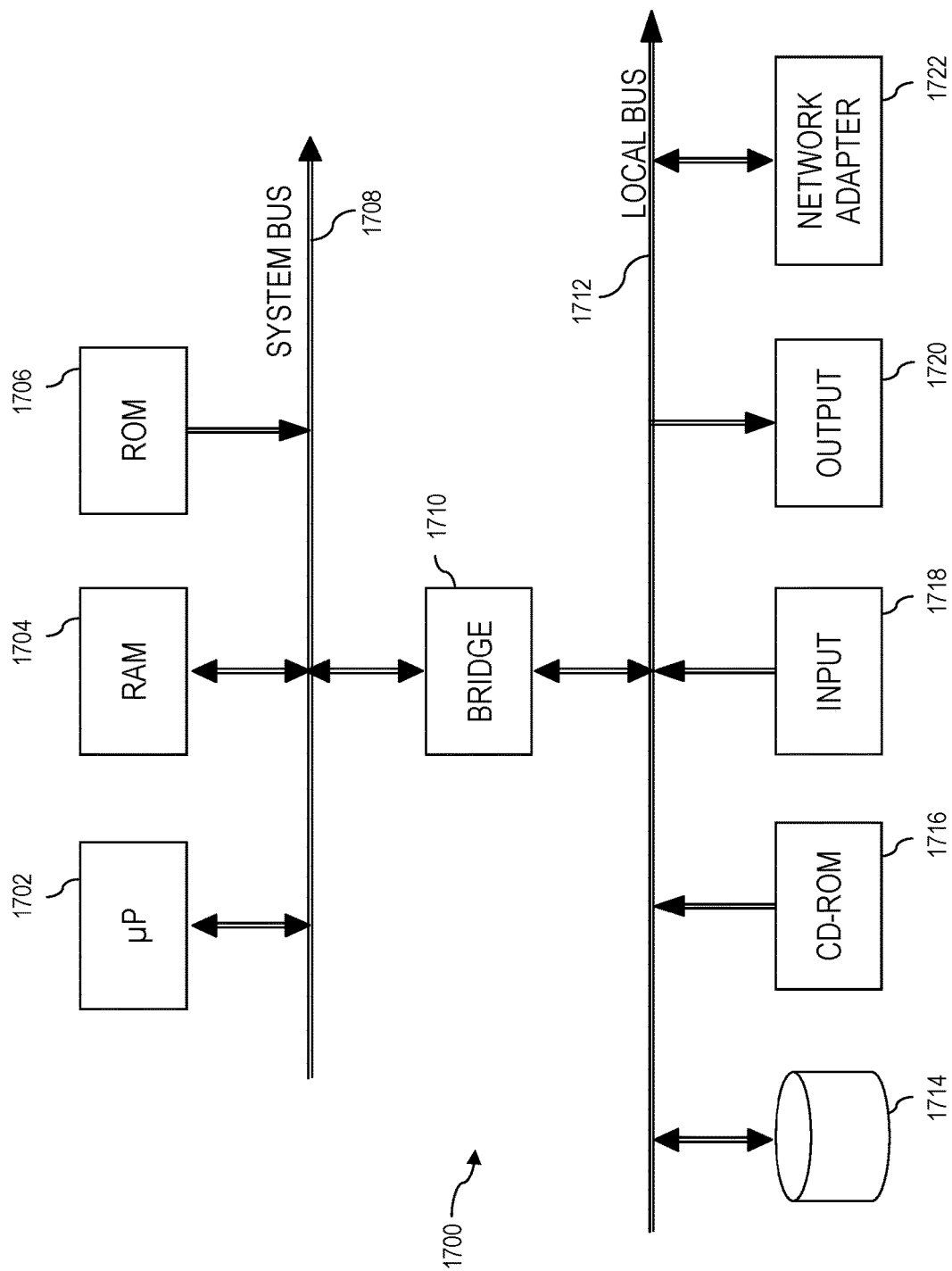
FIG. 17 is a block diagram of a computer processing system capable of implementing any of the systems, processes or methods (or subsets thereof) described more fully herein.

Referring to FIG. 17, a schematic block diagram illustrates an exemplary computer system 1700 for implementing the various methods described herein. The exemplary computer system 1700 includes one or more (hardware) microprocessors (μP) 1702 and corresponding (hardware) memory (e.g., random access memory 1704 and/or read only memory 1706) that are connected to a system bus 1708. Information can be passed between the system bus 1708 and bus 1740 by a suitable bridge 1710 to communicate with various input/output devices. For instance, a local bus 1712 is used to interface peripherals with the one or more microprocessors (μP) 1702, such as storage 1714 (e.g., hard disk drives); removable media storage devices 1716 (e.g., flash drives, DVD-ROM drives, CD-ROM drives, floppy drives, etc.); I/O devices such as input device 1718 (e.g., mouse, keyboard, scanner, etc.) output devices 1720 (e.g., monitor, printer, etc.); and a network adapter 1722. The above list of peripherals is presented by way of illustration, and is not intended to be limiting. Other peripheral devices may be suitably integrated into the computer system 1700.

The microprocessor(s) 1702 control operation of the exemplary computer system 1700. Moreover, one or more of the microprocessor(s) 1702 execute computer readable code (e.g., stored in the memory 1704, 1706 storage 1714, removable media insertable into the removable media storage 1716 or combinations thereof) that instructs the microprocessor(s) 1702 to implement the methods herein.

The methods and processes herein may be implemented as a machine-executable method executed on a computer system, e.g., one or more of the processing devices 102 of FIG. 1, on a particular computing device such as the vehicle computer described with reference to FIG. 3, or combination thereof.

Thus, the exemplary computer system or components thereof can implement methods and computer-readable storage devices as set out in greater detail herein. Other computer configurations may also implement the methods and computer-readable storage devices as set out in greater detail herein. Computer program code for carrying out operations for aspects of the present invention may be written in any combination of one or more programming languages. The program code may execute entirely on the computer system 1700 or partly on the computer system 1700. In the latter scenario, the remote computer may be connected to the computer system 1700 through any type of network connection, e.g., using the network adapter 1722 of the computer system 1700.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. More specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory.

Here, a computer-readable storage device and computer-readable hardware are physical, tangible implementations that are non-transitory. By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory herein, in that the content will persist until acted upon, e.g., by removing power, by overwriting, deleting, modifying, the memory, etc. Moreover, since hardware comprises physical element(s) or component(s) of a corresponding computer system, hardware does not encompass software, per se.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A process to modify vehicle performance parameters for one or more kinematic functions while executing an assigned task, the process comprising:
   receiving, for an industrial vehicle, a job specification;
   simulating the job specification by:
      decomposing the job specification into a workflow model, the workflow model defining tasks of the industrial vehicle within an environment associated with performance of an operation;
      associating the tasks with a kinematic model generated by:
         identifying kinematic functions of the industrial vehicle;
         receiving constraints of an environment in which the industrial vehicle operates;
         computing a cutback curve for a parameter of a select kinematic function of the industrial vehicle; and
         applying the kinematic model to the workflow model based upon a travel path of the job specification to determine results; and
   modifying the vehicle performance parameters in response to simulating the job specification.

2. The process of claim 1, wherein receiving, for an industrial vehicle, a job specification, comprises:
   receiving a job specification that characterizes an operation and a travel path within an environment that is followed by the industrial vehicle to carry out the operation.

3. A process to modify a performance parameter of a kinematic function of an industrial vehicle, the industrial vehicle for executing tasks, the process comprising:
   receiving, for the industrial vehicle, a job specification;
   decomposing the job specification into a workflow model, the workflow model defining the tasks of the industrial vehicle;
   associating the tasks with a kinematic model, the kinematic model generated by:

identifying the kinematic function of the industrial vehicle;
receiving constraints associated with an operation of the industrial vehicle; and
computing a cutback curve for a parameter of the kinematic function;
applying the kinematic model to the workflow model; and
modifying the performance parameter of the industrial vehicle based on the applied kinematic model to the workflow model.

4. The process of claim 3, wherein associating the tasks with a kinematic model includes one selected from the group consisting of:
associating with the kinematic model, starting at a known starting position;
associating with the kinematic model, driving to an inbound slot;
associating with the kinematic model, raising a load-handling feature;
associating with the kinematic model, interacting with a slot;
associating with the kinematic model, driving to an inbound slot and raising a load-handling feature;
associating with the kinematic model, pivoting;
associating with the kinematic model, traversing out;
associating with the kinematic model, gaining a load;
associating with the kinematic model, traversing in;
associating with the kinematic model, losing a load;
associating with the kinematic model, lowering a load-handling feature; and
associating with the kinematic model, ending at a known ending position.

5. The process of claim 3, wherein associating the tasks with a kinematic model comprises associating driving with the kinematic model.

6. The process of claim 3, wherein associating the tasks with a kinematic model comprises associating raising a load-handling feature with the kinematic model.

7. The process of claim 3, wherein associating the tasks with a kinematic model comprises associating raising forks on a forklift truck with the kinematic model.

8. The process of claim 3, wherein associating the tasks with a kinematic model comprises associating lowering a load-handling feature with the kinematic model.

9. The process of claim 3, wherein associating the tasks with a kinematic model comprises associating pivoting with the kinematic model.

10. The process of claim 3, wherein associating the tasks with a kinematic model comprises associating interacting with a slot with the kinematic model.

11. The process of claim 3, wherein receiving the constraints comprises one selected from the group consisting of:
receiving a vehicle capability;
receiving an automation feature of a vehicle;
receiving a semi-automation feature of a vehicle;
receiving a geo-constraint;
receiving an operational constraint; and
receiving an operator constraint.

12. The process of claim 3, further comprising limiting the cutback curve by a condition selected from the group consisting of:
an environmental condition;
an operational condition;
a vehicle operating state condition;
a characteristic of a vehicle operator; and
a vehicle configuration state.

13. The process of claim 12, wherein limiting the cutback curve by the environmental condition comprises limiting the cutback curve by an end-of-aisle condition.

14. The process of claim 12, wherein limiting the cutback curve by the operational condition comprises limiting the cutback curve by a vehicle speed.

15. The process of claim 12, wherein limiting the cutback curve by the vehicle operating state condition comprises limiting the cutback curve by a height of a load-handling feature of the industrial vehicle.

16. The process of claim 12, wherein limiting the cutback curve by the vehicle operating state condition comprises limiting the cutback curve by a fork height of a forklift truck.

17. The process of claim 12, wherein limiting the cutback curve by the characteristic of a vehicle operator comprises limiting the cutback curve by a level of skill of the vehicle operator.

18. The process of claim 12, wherein limiting the cutback curve by the characteristic of a vehicle operator comprises limiting the cutback curve by a certification of the vehicle operator.

19. The process of claim 12, wherein limiting the cutback curve by the vehicle configuration state comprises limiting the cutback curve by an automation feature of the industrial vehicle.

20. A process to modify a performance parameter of a kinematic function of an industrial vehicle, the industrial vehicle for executing tasks, the process comprising:
receiving, for the industrial vehicle, a job specification;
decomposing the job specification into a workflow model, the workflow model defining the tasks of the industrial vehicle, the tasks comprising a task selected from the group consisting of:
driving; and
pivoting;
associating the tasks with a kinematic model, the kinematic model generated by:
identifying the kinematic function of the industrial vehicle;
receiving constraints associated with an operation of the industrial vehicle, the constraints comprising a constraint selected from the group consisting of:
a maximum speed of the industrial vehicle;
a maximum acceleration of the industrial vehicle;
a restricted zone;
a permitted geo-zone;
a warehouse speed limit;
an aisle speed limit;
an operator skill level;
an operator certification;
an automation feature of the industrial vehicle;
a semi-automation feature of the industrial vehicle;
a traction; and
a battery state;
computing a cutback curve for a parameter of the kinematic function, the cutback curve being limited by a condition selected from the group consisting of:
an end-of-aisle condition;
a speed of the industrial vehicle;

a skill level of an operator of the industrial vehicle;
a certification of the operator of the industrial vehicle; and
an automation feature of the industrial vehicle;
applying the kinematic model to the workflow model; and
modifying the performance parameter of the industrial vehicle based on the applied kinematic model to the workflow model.

* * * * *